(12) United States Patent
Namari

(10) Patent No.: US 6,575,136 B1
(45) Date of Patent: Jun. 10, 2003

(54) APPARATUS FOR DETECTING CRANK ANGLE POSITION IN AN INTERNAL COMBUSTION ENGINE

(75) Inventor: Takashi Namari, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 09/762,257

(22) PCT Filed: Apr. 25, 2000

(86) PCT No.: PCT/JP00/02705

§ 371 (c)(1), (2), (4) Date: Apr. 6, 2001

(87) PCT Pub. No.: WO00/75500

PCT Pub. Date: Dec. 14, 2000

(30) Foreign Application Priority Data

Jun. 7, 1999 (JP) .......................................... 11-159490

(51) Int. Cl.[7] ................................................ F02P 5/00
(52) U.S. Cl. .................. 123/406.58; 701/114; 701/115; 73/116; 73/118.1; 123/476; 123/613; 123/617
(58) Field of Search ....................... 123/406.58, 406.61, 123/406.18, 476, 477, 612, 613, 617; 701/114, 115; 73/118.1, 116

(56) References Cited

U.S. PATENT DOCUMENTS 4,664,082 A * 5/1987 Suzuki ........................ 123/414
6,041,647 A * 3/2000 Matsuoka ..................... 73/116

FOREIGN PATENT DOCUMENTS

| JP | A-10-103121 | 4/1998 |
|----|-------------|--------|
| JP | A-2000-80956 | 3/2000 |
| JP | A-2000-97096 | 4/2000 |

* cited by examiner

Primary Examiner—Tony M. Argenbright
Assistant Examiner—Johnny H. Hoang
(74) Attorney, Agent, or Firm—Arent Fox Kintner Plotkin & Kahn, PLLC

(57) ABSTRACT

An apparatus for detecting crank angle position in an internal combustion engine, in which a first rotator, which is interlocked with the crankshaft, has a plurality of detectable parts in the rotation direction, the detectable parts on the first rotator are provided so that adjoining spaces are nearly equal to each other. A second rotator which is interlocked with the camshaft has a plurality of detectable parts in the rotation direction, the detectable parts on the second rotator are provided so that permutations each consisting of at least two of consecutive angle intervals in one rotation direction differ from each other. With this configuration, the stroke of an internal combustion engine can be determined in a short time.

17 Claims, 32 Drawing Sheets

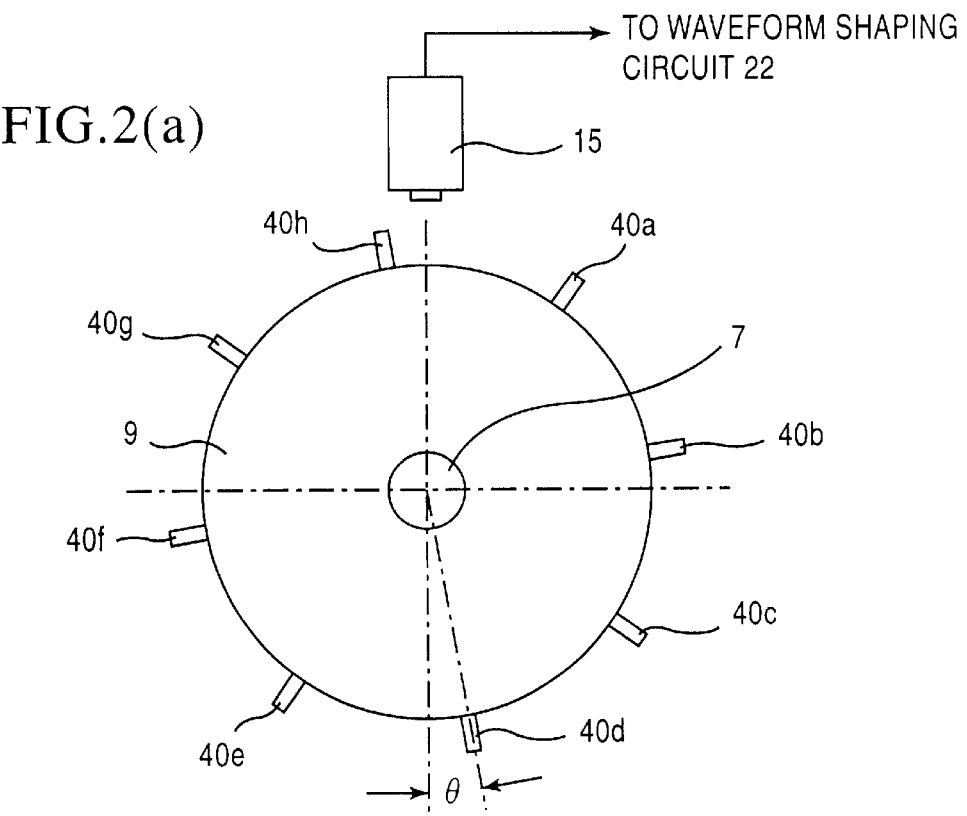
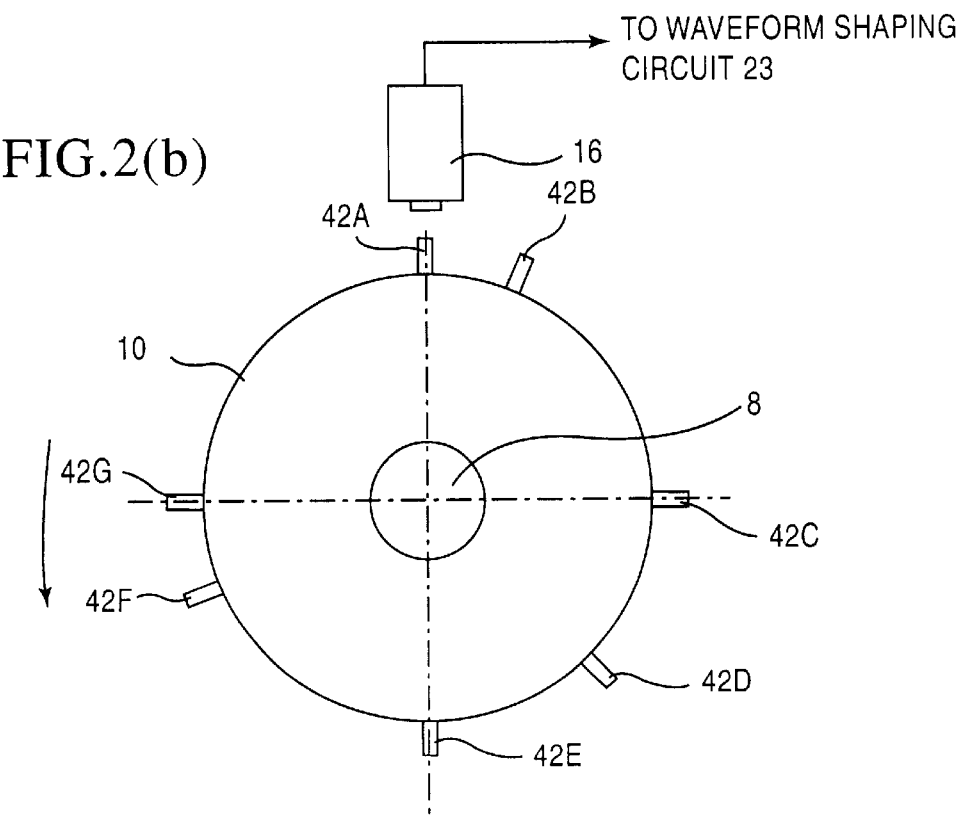

FIG.7(a)

| SECTION | ANGLE SPACE | NUMBER OF CRANK PULSES |
|---|---|---|
| 42A~42B | 22.5 | 1 |
| 42B~42C | 67.5 | 3 |
| 42C~42D | 45.5 | 2 |
| 42D~42E | 45.0 | 2 |
| 42E~42F | 67.5 | 3 |
| 42F~42G | 22.5 | 1 |
| 42G~42A | 90.0 | 4 |

FIG.7(b)

| PROTRUSION NUMBER | PRECEDING VALUE | | PRESENT VALUE | | TOTAL VALUE | STAGE NUMBER |
|---|---|---|---|---|---|---|
| 42A | 1 | (42F~42G) | 4 | (42G~42A) | 5 | 15 |
| 42B | 4 | (42G~42A) | 1 | (42A~42B) | 5 | 0 |
| 42C | 1 | (42A~42B) | 3 | (42B~42C) | 4 | 3 |
| 42D | 3 | (42B~42C) | 2 | (42C~42D) | 5 | 5 |
| 42E | 2 | (42C~42D) | 2 | (42D~42E) | 4 | 7 |
| 42F | 2 | (42D~42E) | 3 | (42E~42F) | 5 | 10 |
| 42G | 3 | (42E~42F) | 1 | (42F~42G) | 4 | 11 |

FIG.9(a)

| SECTION | ANGLE SPACE | NUMBER OF CRANK PULSES |
|---|---|---|
| 52A~52B | 26.0 | 2 |
| 52B~52C | 50.0 | 4 |
| 52C~52D | 78.0 | 6 |
| 52D~52E | 52.0 | 4 |
| 52E~52F | 63.0 | 5 |
| 52F~52G | 39.0 | 3 |
| 52G~52A | 52.0 | 4 |

FIG.9(b)

| PROTRUSION NUMBER | PRECEDING VALUE | | PRESENT VALUE | | TOTAL VALUE | STAGE NUMBER |
|---|---|---|---|---|---|---|
| 52A | 3 | (52F~52G) | 4 | (52G~52A) | 7 | 27 |
| 52B | 4 | (52G~52A) | 2 | (52A~52B) | 6 | 1 |
| 52C | 2 | (52A~52B) | 4 | (52B~52C) | 6 | 5 |
| 52D | 4 | (52B~52C) | 6 | (52C~52D) | 10 | 11 |
| 52E | 6 | (52C~52D) | 4 | (52D~52E) | 10 | 15 |
| 52F | 4 | (52D~52E) | 5 | (52E~52F) | 9 | 20 |
| 52G | 5 | (52E~52F) | 3 | (52F~52G) | 8 | 23 |

FIG.13(a)

| SECTION | ANGLE SPACE | NUMBER OF CRANK PULSES |
|---|---|---|
| 62A~62B | 90.0 | 6 |
| 62B~62C | 30.0 | 2 |
| 62C~62D | 60.0 | 4 |
| 62D~62E | 60.0 | 4 |
| 62E~62F | 30.0 | 2 |
| 62F~62G | 45.0 | 3 |
| 62G~62A | 45.0 | 3 |

FIG.13(b)

| PROTRUSION NUMBER | PRECEDING VALUE | | PRESENT VALUE | | TOTAL VALUE | STAGE NUMBER |
|---|---|---|---|---|---|---|
| 62A | 3 | (62F~62G) | 3 | (62G~62A) | 6 | 23 |
| 62B | 3 | (62G~62A) | 6 | (62A~62B) | 9 | 5 |
| 62C | 6 | (62A~62B) | 2 | (62B~62C) | 8 | 7 |
| 62D | 2 | (62B~62C) | 4 | (62C~62D) | 6 | 11 |
| 62E | 4 | (62C~62D) | 4 | (62D~62E) | 8 | 15 |
| 62F | 4 | (62D~62E) | 2 | (62E~62F) | 6 | 17 |
| 62G | 2 | (62E~62F) | 3 | (62F~62G) | 5 | 20 |

FIG.20(a)

| SECTION | ANGLE SPACE | NUMBER OF CRANK PULSES |
|---|---|---|
| 72A~72B | 40.0 | 2 |
| 72B~72C | 80.0 | 4 |
| 72C~72D | 60.0 | 3 |
| 72D~72E | 60.0 | 3 |
| 72E~72F | 80.0 | 4 |
| 72F~72A | 40.0 | 2 |

FIG.20(b)

| PROTRUSION NUMBER | PRECEDING VALUE | | PRESENT VALUE | | TOTAL VALUE | STAGE NUMBER |
|---|---|---|---|---|---|---|
| 72A | 1 | (72F~72A) | 4 | (72A~72B) | 5 | 17 |
| 72B | 4 | (72A~72B) | 4 | (72B~72C) | 8 | 1 |
| 72C | 4 | (72B~72C) | 1 | (72C~72D) | 5 | 5 |
| 72D | 1 | (72C~72D) | 3 | (72D~72E) | 4 | 8 |
| 72E | 3 | (72D~72E) | 2 | (72E~72F) | 5 | 11 |
| 72F | 2 | (72E~72F) | 4 | (72F~72A) | 6 | 15 |

FIG.25(a)

| SECTION | ANGLE SPACE | NUMBER OF CRANK PULSES |
|---|---|---|
| 82A~82B | 72.0 | 4 |
| 82B~82C | 18.0 | 1 |
| 82C~82D | 54.0 | 3 |
| 82D~82E | 36.0 | 2 |
| 82E~82F | 36.0 | 2 |
| 82F~82G | 54.0 | 3 |
| 82G~82H | 18.0 | 1 |
| 82H~82A | 72.0 | 4 |

FIG.25(b)

| PROTRUSION NUMBER | PRECEDING VALUE | | PRESENT VALUE | | TOTAL VALUE | STAGE NUMBER |
|---|---|---|---|---|---|---|
| 82A | 1 | (82G~82H) | 4 | (82H~82A) | 5 | 19 |
| 82B | 4 | (82H~82A) | 4 | (82A~82B) | 8 | 3 |
| 82C | 4 | (82A~82B) | 1 | (82B~82C) | 5 | 4 |
| 82D | 1 | (82B~82C) | 3 | (82C~82D) | 4 | 7 |
| 82E | 3 | (82C~82D) | 2 | (82D~82E) | 5 | 9 |
| 82F | 2 | (82D~82E) | 2 | (82E~82F) | 4 | 11 |
| 82G | 2 | (82E~82F) | 3 | (82F~82G) | 5 | 14 |
| 82H | 3 | (82F~82G) | 1 | (82G~82H) | 4 | 15 |

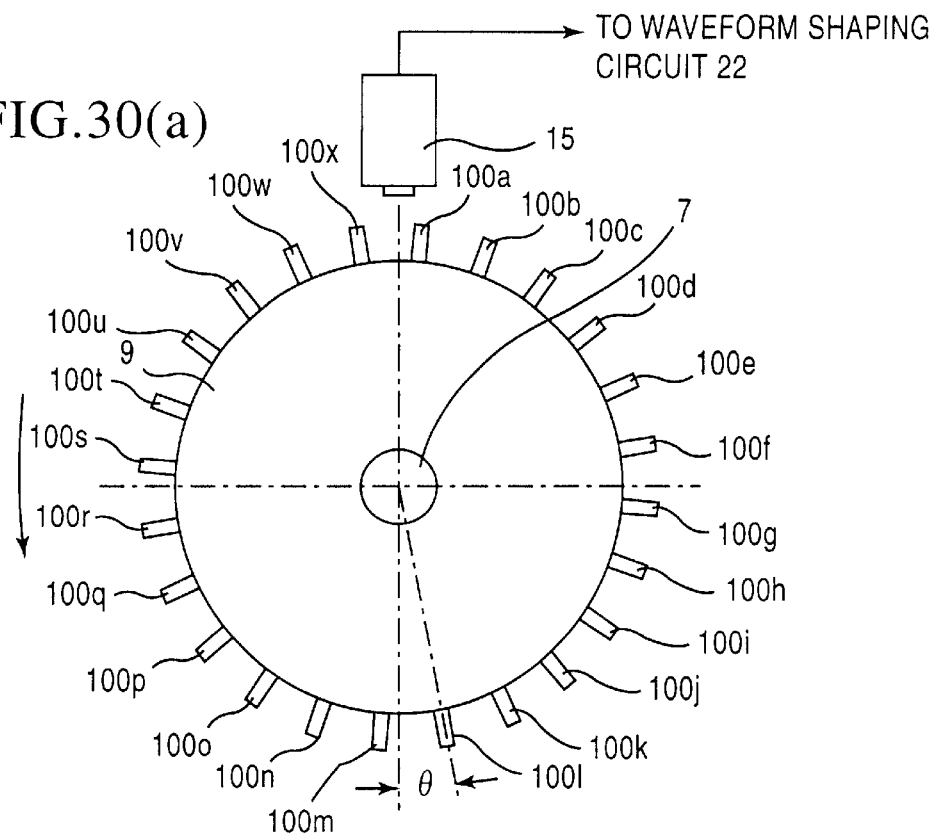
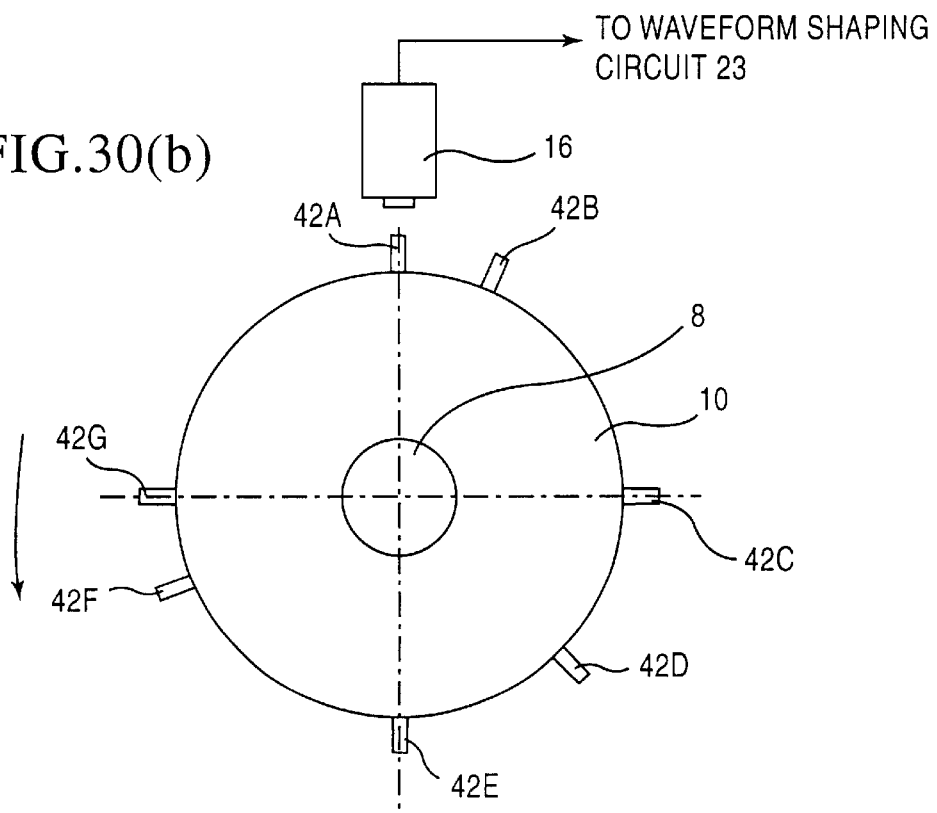

FIG.32(a)

| PROTRUSION NUMBER | NO NOISE GENERATION | | GENERATION OF NOISE | | CORRECTED PRECEDING VALUE | CORRECTED PRESENT VALUE |
|---|---|---|---|---|---|---|
| | PRECEDING VALUE | PRESENT VALUE | PRECEDING VALUE | PRESENT VALUE | | |
| 42A | 2 (42F~42G) | 6 (42G~42A) | 2+1 (42F~42G) | 6+1 (42G~42A) | 2 | 6 |
| 42B | 6 (42G~42A) | 4 (42A~42B) | 6+1 (42G~42A) | 4+1 (42A~42B) | 6 | 4 |
| 42C | 4 (42A~42B) | 4 (42B~42C) | 4+1 (42A~42B) | 4+1 (42B~42C) | 4 | 4 |
| 42D | 4 (42B~42C) | 6 (42C~42D) | 4+1 (42B~42C) | 6+1 (42C~42D) | 4 | 6 |
| 42E | 6 (42C~42D) | 2 (42D~42E) | 6+1 (42C~42D) | 2+1 (42D~42E) | 6 | 2 |
| 42F | 2 (42D~42E) | 8 (42E~42F) | 2+1 (42D~42E) | 8+1 (42E~42F) | 2 | 8 |
| 42G | 8 (42E~42F) | 2 (42F~42G) | 8+1 (42E~42F) | 2+1 (42F~42G) | 8 | 2 |

FIG.32(b)

| PROTRUSION NUMBER | NO NOISE GENERATED | | GENERATION OF NOISE | | CORRECTED PRECEDING VALUE | CORRECTED PRESENT VALUE |
|---|---|---|---|---|---|---|
| | PRECEDING VALUE | PRESENT VALUE | PRECEDING VALUE | PRESENT VALUE | | |
| 42A | 3 (42F~42G) | 9 (42G~42A) | 3+2 (42F~42G) | 9+2 (42G~42A) | 3 | 9 |
| 42B | 9 (42G~42A) | 6 (42A~42B) | 9+2 (42G~42A) | 6+2 (42A~42B) | 9 | 6 |
| 42C | 6 (42A~42B) | 6 (42B~42C) | 6+2 (42A~42B) | 6+2 (42B~42C) | 6 | 6 |
| 42D | 6 (42B~42C) | 9 (42C~42D) | 6+2 (42B~42C) | 9+2 (42C~42D) | 6 | 9 |
| 42E | 9 (42C~42D) | 3 (42D~42E) | 9+2 (42C~42D) | 3+2 (42D~42E) | 9 | 3 |
| 42F | 3 (42D~42E) | 12 (42E~42F) | 3+2 (42D~42E) | 12+2 (42E~42F) | 3 | 12 |
| 42G | 12 (42E~42F) | 3 (42F~42G) | 12+2 (42E~42F) | 3+2 (42F~42G) | 12 | 3 |

APPARATUS FOR DETECTING CRANK ANGLE POSITION IN AN INTERNAL COMBUSTION ENGINE

TECHNICAL FIELD

The present invention relates to an apparatus for detecting crank angle positions in an internal combustion engine.

BACKGROUND OF THE INVENTION

A well known apparatus for detecting crank angle positions in an internal combustion engine is as disclosed in U.S. Pat. No. 2,596,581. This apparatus has a first rotator with magnetic protrusions provided on the crankshaft at regular intervals and, on the camshaft, is a second rotator with magnetic protrusions provided at irregular intervals. This apparatus for detecting crank angle positions detects and counts the number of crank pulses and cam pulses generated by the passing of the magnetic protrusions provided on the first rotator and the second rotator and determines the angle position of the crankshaft in an internal combustion engine by the corresponding number of pulses.

However, such a conventional apparatus for detecting crank angle position in an internal combustion engine may take a long time before it determines the stroke because some angle positions of the crankshaft at the time the engine is started require the crankshaft to rotate more than 360° before a stage number can be determined.

The present invention has been made in consideration of the aforementioned background. The object of the present invention is to provide an apparatus for detecting crank angle positions in an internal combustion engine which can determine the stroke of an internal combustion engine in a short time.

SUMMARY OF THE INVENTION

An apparatus for detecting crank angle position in an internal combustion engine according to the present invention is an apparatus for detecting the rotational angle positions of the crankshaft of the internal combustion engine having a crankshaft and a camshaft which interlocks with the crankshaft at a predetermined revolution ratio. A first rotator and a second rotator, which interlock with the crankshaft and the camshaft respectively, both have a plurality of detectable parts in the rotation direction. The spaces between the adjoining detectable parts on the first rotator are nearly equal to each other. Sequences or permutations each consisting of at least two consecutive or neighboring spaces between the detectable parts in the rotation direction on the second rotator are different from each other.

That is, according to the features of the present invention, the stroke of an internal combustion engine can be determined in a short time because the detectable parts on the first rotator are provided so that adjoining spaces are nearly equal to each other, while the detectable parts on the second rotator are provided so that sequences of at least two adjoining angular spaces in the rotation direction are different from each other.

BRIEF DESCRIPTION OF THE DRAWINGS

FIG. 2 is a schematic diagram of a first embodiment of an arrangement of magnetic protrusions on a first rotator and an arrangement of magnetic protrusions on a second rotator according to the present invention;

FIG. 7 is a table showing the relation of angle spaces between magnetic protrusions on the second rotator to the number of crank pulses counted as the count value in the section, and a table showing stage numbers determined on the basis of the preceding values and the present values;

FIG. 9 is a table showing the relation of angle spaces between magnetic protrusions on the second rotator shown in FIG. 8 to the number of crank pulses counted as the count value in the section, and a table showing stage numbers determined from the preceding values and the present values;

FIG. 13 is a table showing the relation of angle spaces between magnetic protrusions on the second rotator to the number of crank pulses counted as the count value in the section, and a table showing stage numbers determined from the preceding values and the present values;

FIG. 20 is a table showing the relation of angle spaces between magnetic protrusions on the second rotator to the number of crank pulses counted as the count value in the section, and a table showing stage numbers determined from the preceding values and the present values;

FIG. 25 is a table showing the relation of angle spaces between magnetic protrusions on the second rotator to the number of crank pulses counted as the count value in the section, and a table showing stage numbers determined from the preceding values and the present values;

FIG. 30 is a diagram of a seventh embodiment of an arrangement of magnetic protrusions on the first rotator and an arrangement of magnetic protrusions on the second rotator according to the present invention;

FIG. 32 shows tables of the values from which corrected preceding values and corrected present values are calculated when the first and second rotators shown in FIGS. 29 and 30 are used.

BEST MODE FOR CARRYING OUT THE INVENTION

Referring to the accompanying drawings, the embodiments of the present invention are described below.

Figure 1:
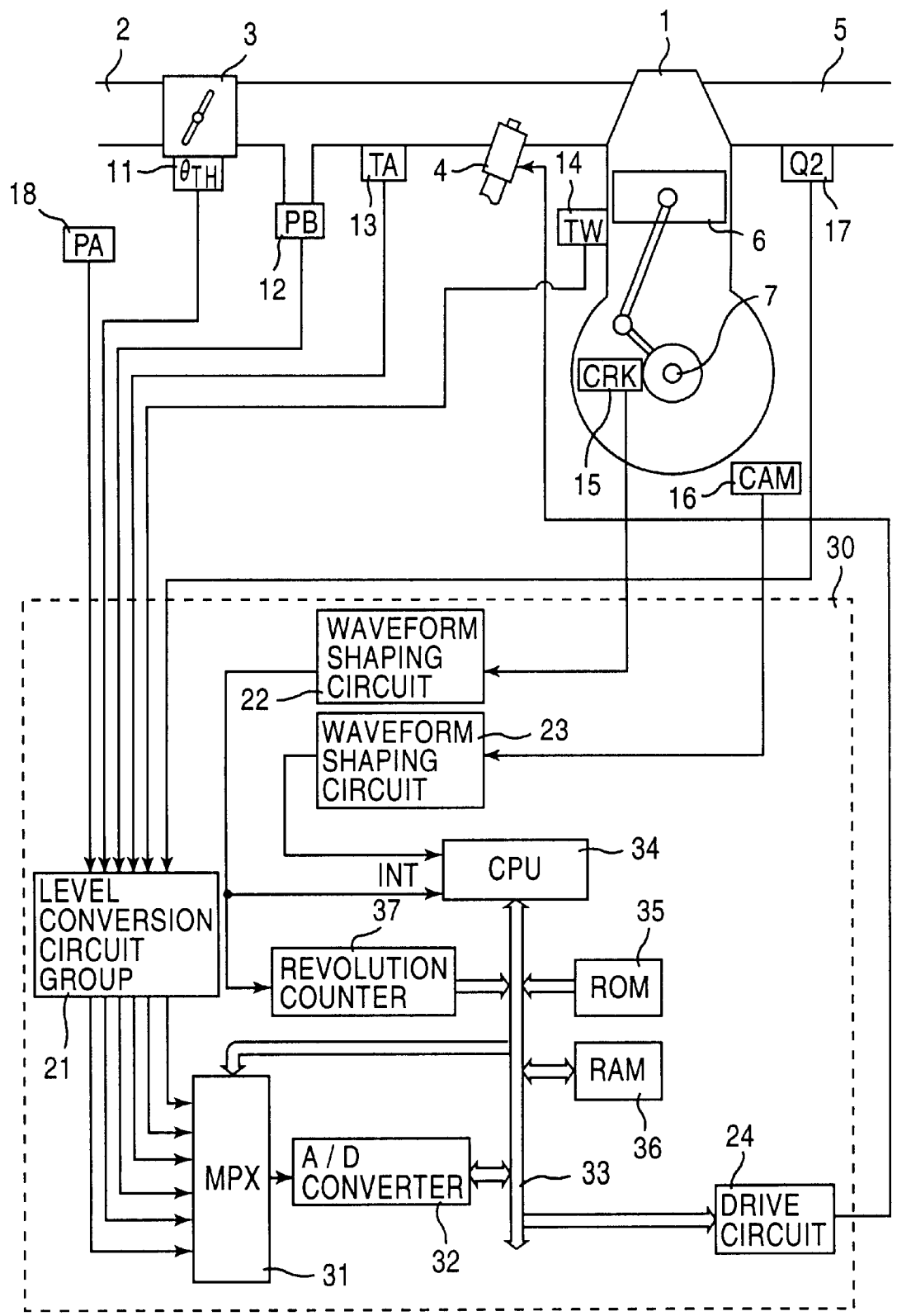
FIG. 1 is a block diagram of an internal combustion engine, the intake system and exhaust system thereof, and the configuration of a control unit for the internal combustion engine.

FIG. 1 shows a configuration of an internal combustion engine, and the intake system, exhaust system, and control unit thereof.

Provided in an intake system 2 of an internal combustion engine 1 is a throttle valve 3 for controlling the volume of intake air taken in from outside of the vehicle. On the throttle valve 3, a throttle valve opening sensor 11 is provided to detect the opening of the throttle valve 3. Also provided in the intake system 2 are an intake pipe pressure sensor 12 to detect the pressure of the intake air and an intake air temperature sensor 13 to detect the temperature of the intake air. A fuel injector 4 is also provided in the intake system 2 for injecting fuel. The internal combustion engine 1 takes in an air-fuel mixture of intake air and fuel injected from the fuel injector 4, and by combusting the air-fuel mixture taken in imparts reciprocating motion to a piston 6, which imparts rotary motion to a crankshaft 7. Also provided in the internal combustion engine 1 is a cooling water temperature sensor 14 to detect the temperature of the cooling water for cooling the internal combustion engine. Near the crankshaft 7, a crank pulse sensor 15 is provided to detect the angle of the crankshaft 7. Also provided in the internal combustion engine 1 is a camshaft (not shown) which is interlocked with the crankshaft 7 at a predetermined revolution ratio, for example, at 2:1. Near the camshaft, a cam pulse sensor 16 is provided to detect rotational angle positions of the camshaft. The air-fuel mixture combusted in the internal combustion engine 1 is exhausted to an exhaust system 5 as exhaust gas. Provided in the exhaust system 5 is an oxygen concentration sensor 17 to detect oxygen concentration in the exhaust gas. Also provided near the internal combustion engine 1 is an atmospheric pressure sensor 18 to detect atmospheric pressure.

Signals output by the sensors 11–14, 17, and 18 described above are supplied to an electronic control unit (hereinafter referred to as ECU) 30. Signals output by the throttle valve opening sensor 11, the intake pipe pressure sensor 12, the intake air temperature sensor 13, the cooling water temperature sensor 14, the oxygen concentration sensor 17 and the atmospheric pressure sensor 18 are supplied to a multiplexer (hereinafter referred to as MPX) 31 in the ECU 30 after being supplied to a level conversion circuit group 21 to be converted to predetermined voltage signals. The MPX 31 is a switch that selectively supplies one of the output signals from the throttle valve opening sensor 11, the intake pipe pressure sensor 12, the intake air temperature sensor 13, the cooling water temperature sensor 14, the oxygen concentration sensor 17, and the atmospheric pressure sensor 18 to an A/D converter 32 in response to instructions from a CPU 34 at a predetermined timing. The A/D converter 32 converts the supplied signals to digital signals and supplies them to an input/output bus 33. The input/output bus 33 is designed to input/output data signals or address signals to and from the CPU 34.

Signals from the crank pulse sensor 15, for example, a pulse signal given at every 30° of crank angle, are supplied as an interrupt input to the CPU 34 and to revolution counter 37 after being supplied to a waveform shaping circuit 22 to have the waveform shaped. The revolution counter 37 is designed to output a digital value corresponding to the revolution of the internal combustion engine. An output signal from the revolution counter 37 is supplied to the input/output bus 33. A pulse signal from the cam pulse sensor 16 is supplied as an interrupt input to the CPU 34 after being supplied to a waveform shaping circuit 23 to have the waveform shaped. With the configuration described above, the CPU 34 can detect the reference position of the crankshaft 7, and the revolution and crank angle of the internal combustion engine.

Connected to the input/output bus 33 are a ROM 35, RAM 36 and a drive circuit 24 for driving the fuel injector 4. When a fuel injection control command is supplied from the CPU 34 to the fuel injector 4, a fuel injection valve (not shown) in the fuel injector 4 is operated to control the amount of fuel supplied. The ROM 35 stores programs for detecting the rotational angle position of the crankshaft according to the flow charts shown in FIGS. 4, 5, 17 and 18.

FIG. 2 shows a first embodiment of an arrangement of magnetic protrusions on a first rotator and an arrangement of magnetic protrusions on a second rotator according to the present invention.

As shown in FIG. 2(a), a circular first rotator 9 is provided on the crankshaft 7 so as to interlock with the rotational motion of the crankshaft 7. As indicated by the arrow in the figure, when the crankshaft 7 rotates counterclockwise, the first rotator 9 also rotates counterclockwise. On the periphery of the first rotator 9, eight magnetic protrusions 40a–40h are provided as detectable parts at spaces of every 45° in the rotation direction. Provided near the rotational locus of the magnetic protrusions 40a–40h is the crank pulse sensor 15 which generates a pulse signal (hereinafter referred to as crank pulse signal) corresponding to the change in magnetic flux generated by the magnetic protrusions whenever a magnetic protrusion passes by.

As shown in FIG. 2(b), a circular second rotator 10 is provided on a camshaft 8 so as to interlock with the rotational motion of the crankshaft 7, and it rotates in the counterclockwise direction as indicated by the arrow, in the same manner as the first rotator. Because the camshaft 8 is connected to the crankshaft 7 via a chain sprocket (not shown), the rotation of the crankshaft 7 is transmitted to the camshaft 8 after being decelerated at a predetermined speed reduction ratio, for example, 2:1. On the periphery of the camshaft 8, seven magnetic protrusions 42A–42G are provided as detectable parts at predetermined intervals so that no two spaces between adjoining magnetic protrusions are the same: in this first embodiment, 22.5° between 42A and 42B, 67.5° between 42B and 42C, 45.0° between 42C and 42D, 45.0° between 42D and 42E, 67.5° between 42E and 42F, 22.5° between 42F and 42G and 90° between 42G and 42A. In the same manner as for the first rotator, near the rotational locus of the magnetic protrusions 42A–42G, the cam pulse sensor 16 is provided.

In the first embodiment, the maximum space between adjoining detectable parts on the first rotator is 45° because the magnetic protrusions serving as detectable parts are provided on the first rotator at regular intervals of 45°. The minimum interval between adjoining detectable parts on the second rotator is 22.5° between 42A and 42B or between 42F and 42G. The revolution ratio of the first rotator to the second rotator is 2:1 as described above. Accordingly, in the first embodiment, the value obtained by multiplying 22.5°, the minimum interval on the second rotator, by 2, the revolution ratio, is equal to the maximum interval on the first rotator, 45°. Furthermore, the first rotator 9 is provided at a position biased in the rotation direction by the predetermined angle θ to the crankshaft 7 so that pulse signals from the crank pulse sensor 15 and from the cam pulse sensor 16 (hereinafter referred to as the cam pulse signal) are not given simultaneously.

Figure 3:
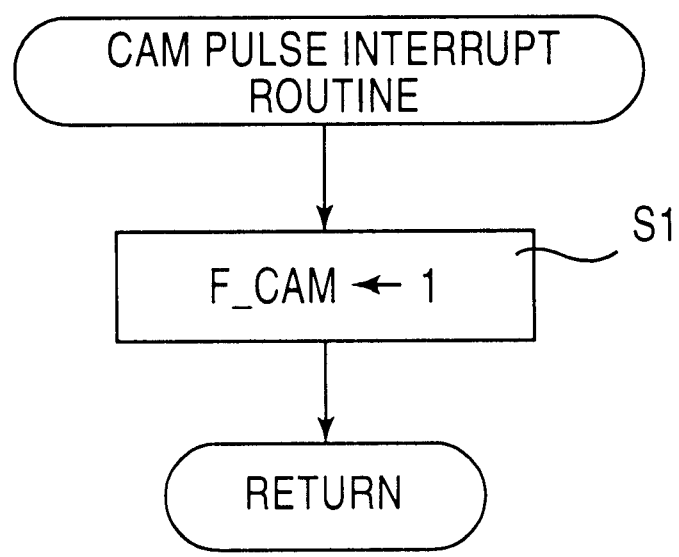
FIG. 3 is a flow chart of a subroutine carried out by the interrupt processing when a cam pulse signal is detected.

FIG. 3 is a flow chart of a subroutine carried out by the interrupt processing when a cam pulse signal described above is detected.

When this subroutine ends, it sets the value of flag F_CAM to 1 (step S1). When a cam pulse signal is generated as an interrupt request and this subroutine is carried out by the interrupt processing, the value of flag F_CAM is set to 1. When a crank pulse signal is generated as an interrupt request and the subroutine shown in FIG. 4 and described later is carried out by the interrupt processing, the value of flag F_CAM is initialized in step S12 in FIG. 4, for example, set to 0.

Figure 4:
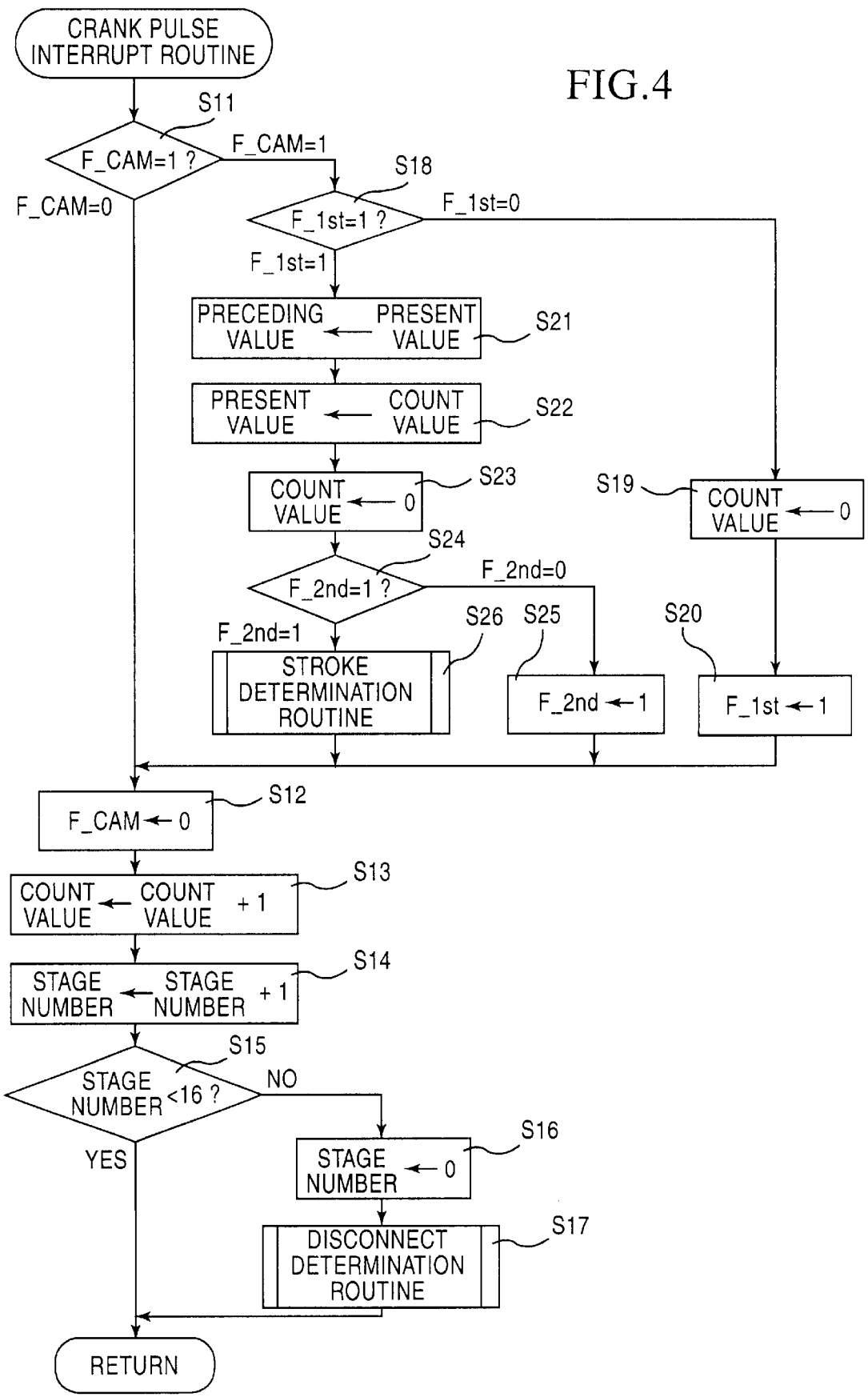
FIG. 4 is a flow chart of a subroutine carried out by the interrupt processing for obtaining the preceding value and present value when a crank pulse signal is generated.

FIG. 4 shows a subroutine for obtaining the preceding value and present value by being carried out by the interrupt processing when a crank pulse signal is generated.

Whether the value of flag F_CAM is 1 or not is decided first Em (step S11). If the value of flag F_CAM is 1, it means the interrupt processing subroutine caused by a cam pulse signal as shown in FIG. 3, was carried out between the last time a crank pulse signal was generated as an interrupt request followed by execution of the subroutine and the time the subroutine is being carried out this time because a crank pulse signal was generated. If the value of flag F_CAM is 0, it means the subroutine shown in FIG. 3 was not carried out between the last time a crank pulse signal was generated and the subroutine was carried out and the time the subroutine is being carried out this time because a crank pulse signal was generated.

In order to carry out the process corresponding to the value of flag F_CAM, the value of flag F_CAM is set to 0 after executing the stroke determination process in steps S18–S26 according to preceding value and present value to be described when the value of flag F_CAM is determined to be 1 in step S11 (step S12). If the value of flag F_CAM is determined to be 0 in step S11, the value of flag F_CAM is immediately set to 0 so as to be initialized (step S12). After step S12, the count value is increased by a predetermined value, for example, 1 (step S13), and the stage number value is increased by a predetermined value, for example, 1 (step S14). Whether the stage number value is below 16 or not is decided next (step S15). When the stage number value is determined to be below 16, the subroutine is immediately terminated. When the stage number value is determined to be 16 or more, the stage number value is set to the initial value, for example, 0 (step S16), and a disconnect determination subroutine is carried out (step S17) before the subroutine is terminated.

When a cam pulse signal is generated, whether the value of flag F_1st is 1 or not is decided after the value of flag F_CAM is determined to be 1 in step S11 (step S18). F_1st is a flag for showing whether the first cam pulse signal has been detected or not. If the first cam pulse signal has already been detected, the value of flag F_1st is set to 1, and if the first cam pulse signal has not been detected, the value of flag F_1st is set to 0. When the value of flag F_1st is determined to be 0 in step S18, the count value is initialized to the initial value, for example, 0 (step S19), and the value of flag F_1st is set to 1 (step S20). The subroutine is then terminated after carrying out the process of steps S12–S17 described above. The count value is the value counted from the pulse number of the crank pulse signal generated between the last time a cam pulse signal was generated and the present point of time.

When the value of flag F_1st is determined to be 1 in step S18, the present value is substituted for the preceding value (step S21) and the count value is substituted for the present value (step S22), then the count value is initialized to the initial value, for example, 0 (step S23). The present value is the value counted from the pulse number of the crank pulse signal generated between the last time a cam pulse signal was generated and the time when the present cam pulse signal is generated. The preceding value is the value counted from the pulse number of the crank pulse signal generated between the point of time a cam pulse signal was generated two times before and the point of time a cam pulse signal was generated last. Whether the value of flag F_2nd is 1 or not is decided next (step S24). F_2nd is a flag for showing whether a second cam pulse signal has been detected or not. If a second cam pulse signal has already been detected, the value of flag F_1st is set to 1, and if not, the value of flag F_1st is set to 0. When the value of flag F_2nd is determined to be 0 in step S24, the value of flag F_2nd is set to 1 (step S25) and the subroutine is terminated after carrying out steps S12–S17. When the value of flag F_2nd is determined to be 1 in step S24, a stroke determination routine to be described is carried out (step S26) and then the subroutine is terminated after carrying out steps S12–S17.

Figure 5:
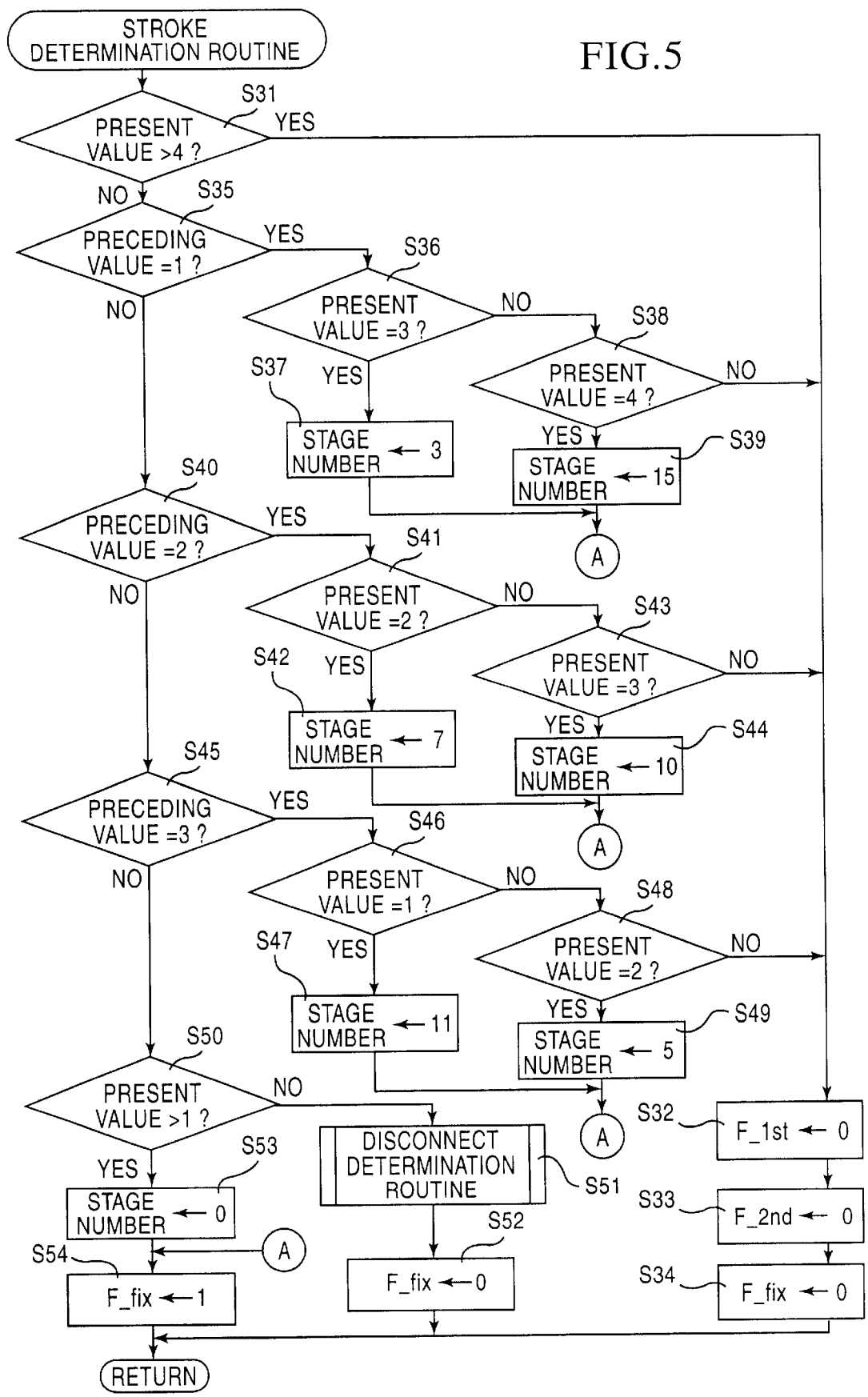
FIG. 5 is a flow chart of a subroutine for determining the stroke of the internal combustion engine on the basis of the preceding value and the present value obtained by carrying out the subroutine in FIG. 4.

FIG. 5 shows a subroutine for determining the stroke of the internal combustion engine according to the preceding value and the present value obtained by carrying out the subroutine shown in FIG. 4.

Whether the present value is larger than 4 or not is decided (step S31). When the present value is determined to be larger than 4, the value of flag F_1st is set to 0 (step S32), the value of flag F_2nd is set to 0 (step S33), the value of flag F_fix is set to 0 (step S34) and then the subroutine is terminated. When the present value is determined to be larger than 4, it means, for example, the number of pulses has been miscounted because a noise signal was generated that superimposed a crank pulse signal. F_fix is a flag for showing whether the stage number for showing the stroke of the internal combustion engine has been determined or not by carrying out the subroutine. If the stage number has been successfully determined, the value of flag F_fix is set to 1; if not, the value of flag F_fix is set to 0.

When present value is determined to be 4 or less in step S31, whether the preceding value is 1 or not is decided (step S35). If the preceding value is determined to be 1, whether the present value is 3 or not is decided (step S36). If the present value is determined to be 3, the stage number is set to 3 (step S37). If the present value is determined not to be 3, whether the present value is 4 or not is decided (step S38). When the present value is determined to be 4, the stage number is set to 15 (step S39). If the stage number is successfully determined, the value of flag F_fix is set to 1 (step S54) and the subroutine is terminated. When the present value is determined to be not 4 in step S38, the subroutine is terminated after carrying out steps S32–S34.

When the preceding value is determined to be 1 in step S35, whether the preceding value is 2 or not is decided (step S40). If the preceding value is determined to be 2, whether the present value is 2 or not is decided (step S41). If the present value is determined to be 2, the stage number is set to 7 (step S42). If the present value is determined not to be 2, whether the present value is 3 or not is decided (step S43). When the present value is determined to be 3, the stage number is set to 10 (step S44). If the stage number is successfully determined, the value of flag F_fix is set to 1 (step S54) and the subroutine is terminated. When the present value is determined not to be 3 in step S43, the subroutine is terminated after carrying out steps S32–S34.

When the preceding value is determined not to be 2 in step S40, whether the preceding value is 3 or not is decided (step S45). If the preceding value is determined to be 3, whether the present value is 1 or not is decided (step S46). If the present value is determined to be 1, the stage number is set to 11 (step S47). If the present value is determined not to be 1, whether the present value is 2 or not is decided (step S48). When the present value is determined to be 2, the stage number is set to 5 (step S49). If the stage number is successfully determined, the value of flag F_fix is set to 1 (step S54) and the subroutine is terminated. If the present value is determined not to be 2 in step S48, the subroutine is terminated after carrying out steps S32–S34.

When the preceding value is determined not to be 3 in step S45, whether the preceding value is larger than 1 or not is decided (step S50). If the preceding value is determined to be 1 or less, the disconnect determination routine is carried out (step S51), and the value of flag F_fix is set to 0 (step S52) before the subroutine is terminated. If the preceding value is determined to be larger than 1, the stage number is set to 0 because the preceding value is 4 (step S53), the value of flag F_fix is set to 1 (step S54), and the subroutine is terminated.

Figure 6:
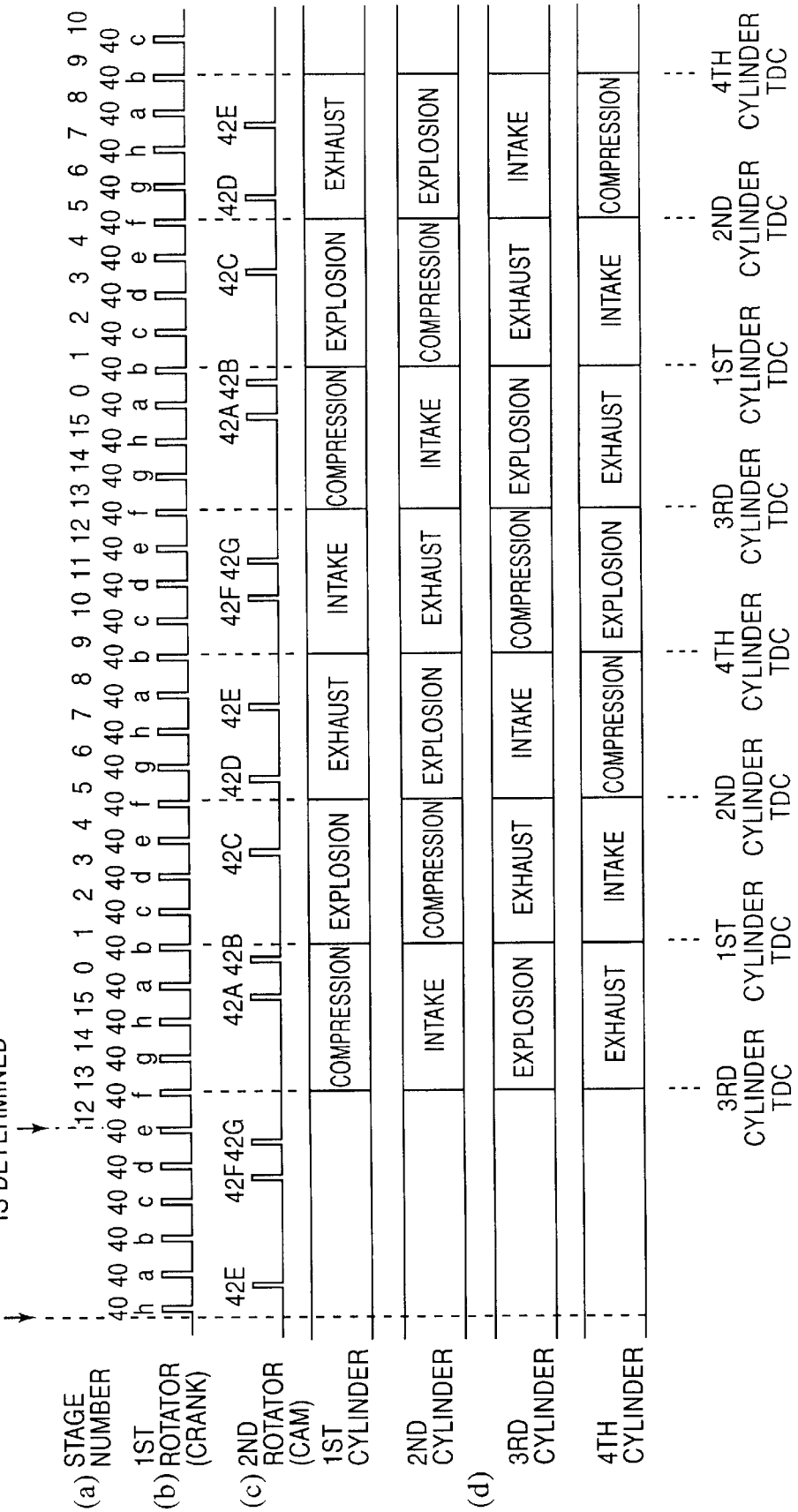
FIG. 6 is a diagram of an example of the engine stroke at the time the internal combustion engine is started when the first and second rotators shown in FIG. 2 are used in a 4-cylinder internal combustion engine.

FIG. 6 shows an example of the engine stroke at the starting time of the internal combustion engine when the first and second rotators shown in FIG. 2 are used in a 4-cylinder internal combustion engine.

The crankshaft 7 and the camshaft 8 start rotating when the internal combustion engine is started. As shown in FIG. 6(b), the magnetic protrusion 40h on the first rotator is detected first and a crank pulse signal is sent from the crank pulse sensor 15 immediately after the internal combustion engine starts. At this point of time, no magnetic protrusions on the second rotator shown in FIG. 6(c) have been detected and no cam pulse signals have been sent. Accordingly, because the value of flag F_CAM is 0, the steps in the subroutine shown in FIG. 4 are carried out in the order of S11→S12→S13→S14→S15.

As the crankshaft and the camshaft continue to rotate, a cam pulse signal is sent from the cam pulse sensor 16 when magnetic protrusion 42E on the second rotator is detected as shown in FIG. 6(c), and the value of F_CAM is set to 1 by the subroutine shown in FIG. 3. If magnetic protrusion 40A on the first rotator is detected as shown in FIG. 6(b), the steps of the subroutine shown in FIG. 4 are carried out in the order of S11→S18→S19→S20→S12→S13→S14→S15 and the value of flag F_1st is set to 1 in step S20. The first cam pulse signal in this example means the cam pulse sent after detecting magnetic protrusion 42E. If magnetic protrusion 40b on the first rotator is detected next, the subroutine shown in FIG. 4 is carried out in the order of S11→S12→S13→S14→S15 because the value of flag F_CAM has been set to 0. The count value increased by 1 every time a crank pulse signal is sent by the process of step S13.

At the point of time when magnetic protrusion 42F on the second rotator is detected as shown in FIG. 6(c), the count value becomes 3 because 40a–40c shown in FIG. 6(b) are counted. When magnetic protrusion 40d is detected, the value of flag F_CAM is set to 1. When the magnetic protrusion 40d on the first rotator is detected next, the subroutine shown in FIG. 4 is carried out in the order of steps S11→S18→S21→S22→S23→S24→S25→S12→S13→S14→S15 because the value of flag F_CAM has been set to 1 and the value of F_1st is set to 1. In step S25, the value of flag F_2nd is set to 1. In the example shown in FIG. 6, the second cam pulse signal means a cam pulse sent after detecting magnetic protrusion 42F. At this point of time, a predetermined initial value remains as the present value, and the preceding value in step S21 is replaced by the initial value. In step S22, however, the count value 3 replaces the present value. Accordingly, the present value at this point of time is the value counted from three pulses representing 40a–40c on the first rotator. Because the count value is initialized in step S23 and incremented by 1 in step 13, the count value becomes 1. This count value results from detecting 40d on the first rotator.

When magnetic protrusion 42G on the second rotator is detected as shown in FIG. 6(c), the value of flag F__CAM is set to 1, and when magnetic protrusion 40e on the first rotator is detected as shown in FIG. 6(b), the value of flag F__CAM is set to 1. Because the value of F__1st has been set to 1 and the value of F__2nd has been set to 1, the subroutine shown in FIG. 4 is carried out in the order of steps S11→S18→S21→S22→S23→S24→S26→S12→S13→S14→S15. As described above, the preceding value becomes 3 in step S21 because the present value has been set to 3, and because the count value has been set to 1, the present value becomes 1 in step S22. At this point of time, the preceding value is the value counted from three pulses representing 40a–40c on the first rotator and the present value is the value counted from one pulse representing 40d on the first rotator. In step S26, the stroke determination subroutine shown in FIG. 5 is carried out because the preceding value=3 and the present value=1. When the preceding value=3 and the present value=1, the value of the stage number is set to 11 from step S47 in FIG. 5 on. Because the value of the stage number is incremented by 1 in step S14 in FIG. 4, the stage number can be determined to be 12 at the point of time when magnetic protrusion 40e on the first rotator is detected.

As the above description explains, the stage number can be determined by detecting three cam pulse signals, making it possible to determine the stroke of each cylinder of an internal combustion engine. As shown in FIG. 6(a), the top dead center (hereinafter referred to as TDC) position of each cylinder can be determined, as shown in FIG. 6(d), after the stage number has been determined. For example, it can be determined that the TDC position is TDC of the 3rd cylinder when the stage number is 13, TDC of the 1st cylinder when the stage number is 1, TDC of the 2nd cylinder when the stage number is 5, and TDC of the 4th cylinder when the stage number is 9. The timing of fuel injection or ignition can be controlled accurately in this manner.

FIG. 7 shows the relation of angle interval between magnetic protrusions on the second rotator shown in FIG. 2(b) to the number of crank pulses counted as the count value in the section, and the stage numbers determined from preceding values and present values.

Shown in the first row of FIG. 7(a) are sections between two consecutive adjoining magnetic protrusions on the second rotator. When the angle interval in each section between magnetic protrusions is set as shown in the second row of FIG. 7(a), the number of pulses as crank pulse signals shown in the third row is counted during the time for detecting these two magnetic protrusions on the second rotator by the subroutine shown in FIG. 4.

Shown in the first row of FIG. 7(b) are the numbers of magnetic protrusions on the second rotator to be detected at the present point of time. Shown in the second row are the preceding values when each of these numbered magnetic protrusions is detected. Present values are shown in the third row. Sections shown in parentheses following the preceding and present values mean the sections where the preceding and present values were obtained. The fourth row of FIG. 7(b) shows the sums of the preceding and present values to be described. As stated above, preceding values and present values are obtained from the number of pulses as crank pulse signals counted by the subroutine shown in FIG. 4, and the stage numbers shown in the fifth row of FIG. 7(b) are obtained by the subroutine shown in FIG. 5 according to the list of values of the preceding values and the present values; that is, according to the permutation. The stage numbers shown in the fifth row are the values obtained in steps S37, S39, S42, S44, S47, S49, and S52 of the subroutine shown in FIG. 5. The permutation may be defined as the line of values of the preceding value and the present value or as the line of two consecutive angle spaces, for example, the line of two angle spaces of 22.5° between 42F and 42G and 90° between 42G and 42A may be called the permutation at the point of time when magnetic protrusion 42A on the second rotator is detected.

FIG. 8 shows a second embodiment of an arrangement of magnetic protrusions on the first rotator and an arrangement of magnetic protrusions on the second rotator according to the present invention. The same reference symbols are given to the components corresponding to those shown in FIG. 2.

Figure 8A:
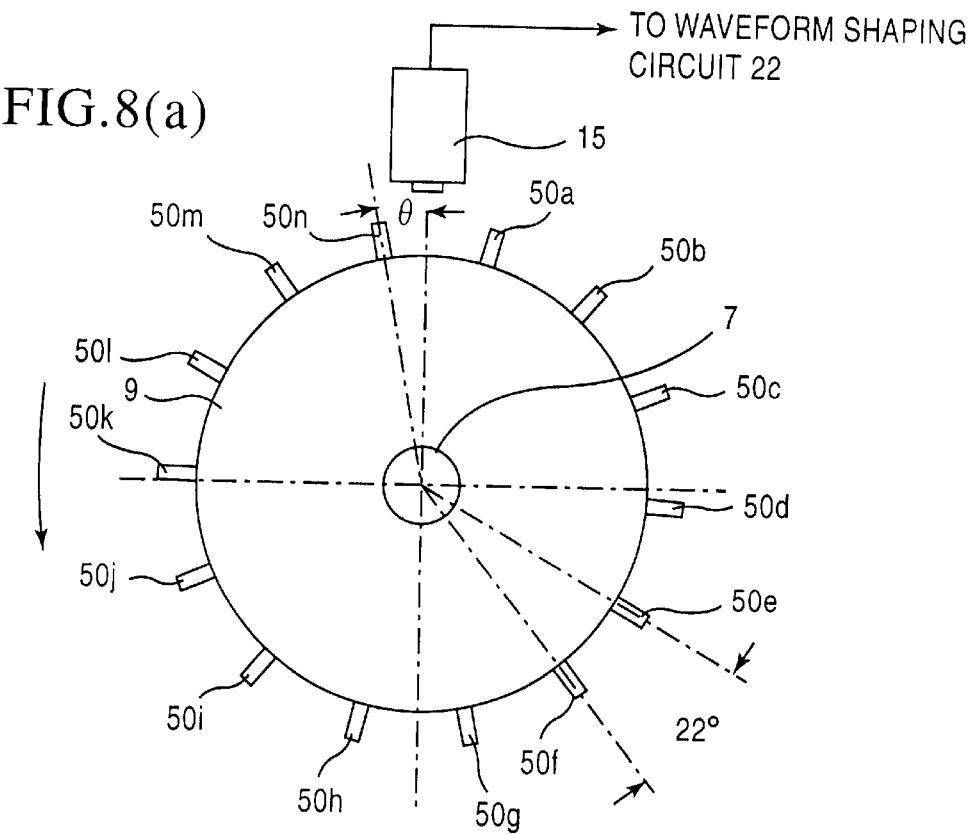
FIG. 8 is a schematic diagram of a second embodiment of an arrangement of magnetic protrusions on the first rotator and an arrangement of magnetic protrusions on the second rotator according to the present invention.
Figure 8B:
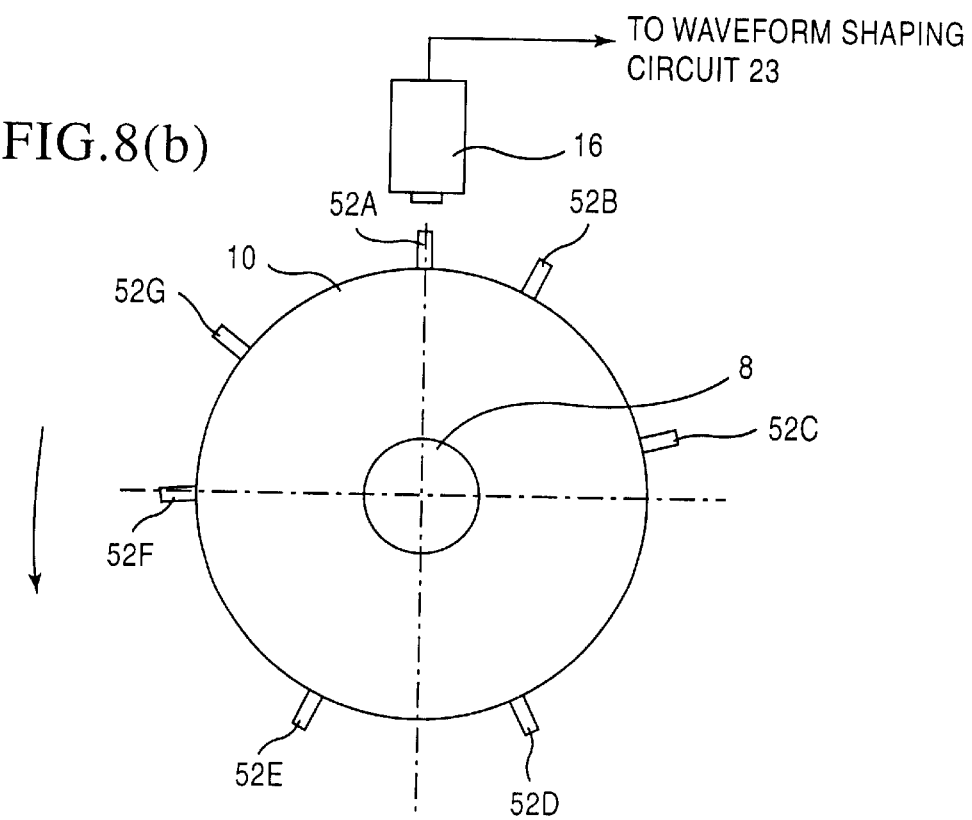

As shown in FIG. 8(a), on the periphery of the first rotator 9 on the crankshaft 7, fourteen magnetic protrusions 50a–50n are provided as detectable parts at nearly regular intervals in the rotation direction. In the second embodiment, however, the angle space between magnetic protrusions 50e and 50f is 22°, and all the other angle spaces between two adjoining magnetic protrusions are 26°. As shown in FIG. 8(b), on the periphery of the second rotator 10 on the camshaft 8 which is interlocked to rotate with the crankshaft 7, seven magnetic protrusions 52A–52G are provided as detectable parts. The magnetic protrusions are provided in such a way that no two adjoining spaces between magnetic protrusions are the same such as 26° between 52A and 52B, 50° between 52B and 52C, 78° between 52C and 52D, 52° between 52D and 52E, 63° between 52E and 52F, 39° between 52F and 52G, and 52° between 52G and 52A. The first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, at 2:1 in the same manner as the case shown in FIG. 2.

In the second embodiment, the maximum interval between adjoining detectable parts provided on the first rotator is 26° in all the sections except the one between 50e and 50f. The minimum interval between adjoining detectable parts provided on the second rotator is 26° between 52A and 52B. As described above, the revolution ratio of the first rotator to that of the second rotator is 2:1. Accordingly, in the second embodiment, the value obtained by multiplying 26°, the minimum interval on the second rotator, by 2, the ratio of revolution, is larger than the maximum interval on the first rotator.

FIG. 9 shows the relation of the angle space between magnetic protrusions on the second rotator shown in FIG. 8 to the number of crank pulses counted as the count value in the section, and stage numbers determined from preceding values and present values. Each of the rows in the tables in FIGS. 9(a) and 9(b) is the same as in the tables in FIG. 7.

The angle intervals between two consecutive adjoining magnetic protrusions on the second rotator shown in FIG. 8(b) are given in the second row of FIG. 9(a). The number of pulses as a crank pulse signals as shown in the third row is counted during the time for detecting two adjoining magnetic protrusions by a crank pulse interrupt routine which is similar to the subroutine in FIG. 4. In the second embodiment, step S15 of the crank pulse interrupt routine shown in FIG. 4 carries out the crank pulse interrupt routine by deciding whether the value of the stage number is below 28 or not. The number of crank pulses can be counted accurately even though some spaces between magnetic protrusions on the first rotator are different, by providing the angle intervals between magnetic protrusions on the second rotator in the manner described above.

Figure 10:
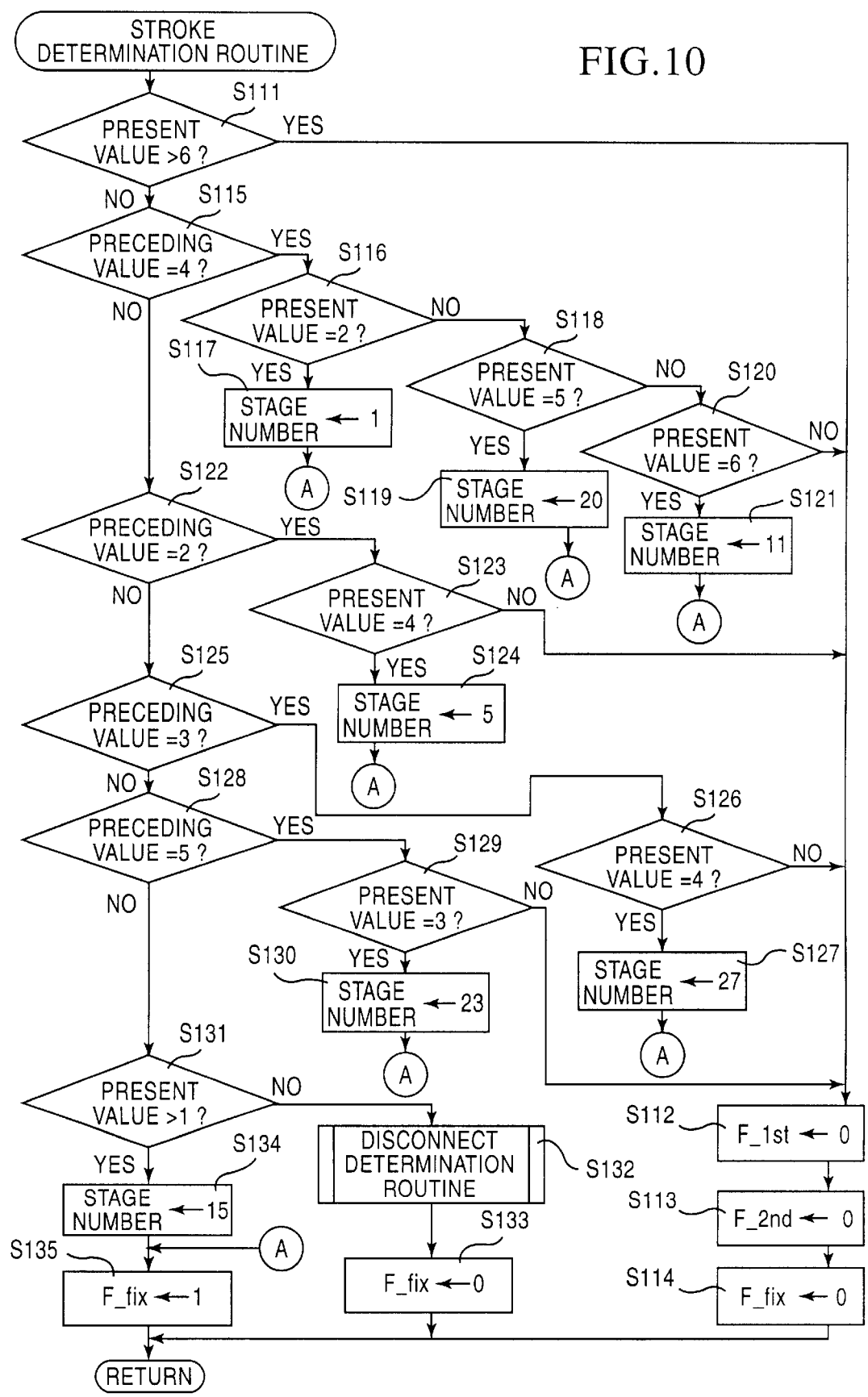
FIG. 10 is a flow chart of a subroutine for determining the stroke of an internal combustion engine on the basis of the preceding value and the present value when the first and second rotators shown in FIG. 8 are used in a V-type 2-cylinder internal combustion engine.

As shown in FIG. 9(b), the stage number can be determined by carrying out the stroke determination routine as shown in FIG. 10 according to the preceding values and the present values obtained from the number of pulses as crank pulse signals. The stroke determination routine shown in FIG. 10 is similar to the subroutine shown in FIG. 5 and is carried out when the first and second rotators shown in FIG. 8 are used in a V-type 2-cylinder internal combustion engine to be described.

Figure 11:
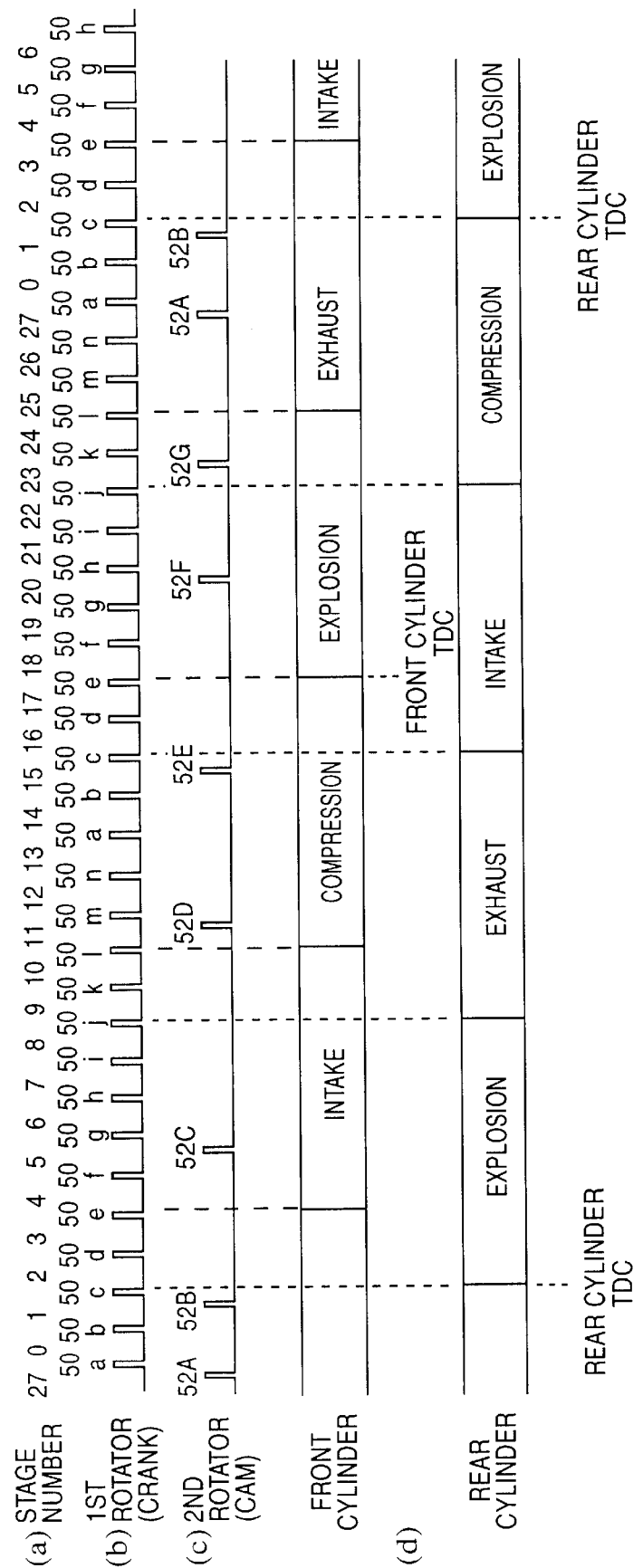
FIG. 11 is a time chart of an example of the engine stroke when the first and second rotators shown in FIG. 8 are used in a V-type 2-cylinder internal combustion engine.

FIG. 11 shows an example of the engine stroke when the first and second rotators shown in FIG. 8 are used in a V-type 2-cylinder internal combustion engine.

In this case, too, the stage number of the internal combustion engine can be determined by detecting three pulses sent ass a cam pulse signals, for example, for the magnetic protrusions 52A, 52B, and 52C shown in FIG. 11(c). It can be determined that, for example, the TDC position is TDC of the rear cylinder when the stage number is 2 and TDC of the front cylinder when the stage number is 18.

FIG. 12 shows a third embodiment of an arrangement of magnetic protrusions on the first rotator and an arrangement of magnetic protrusions on the second rotator according to the present invention. The same reference symbols are given to the components corresponding to those shown in FIG. 2.

Figure 12A:
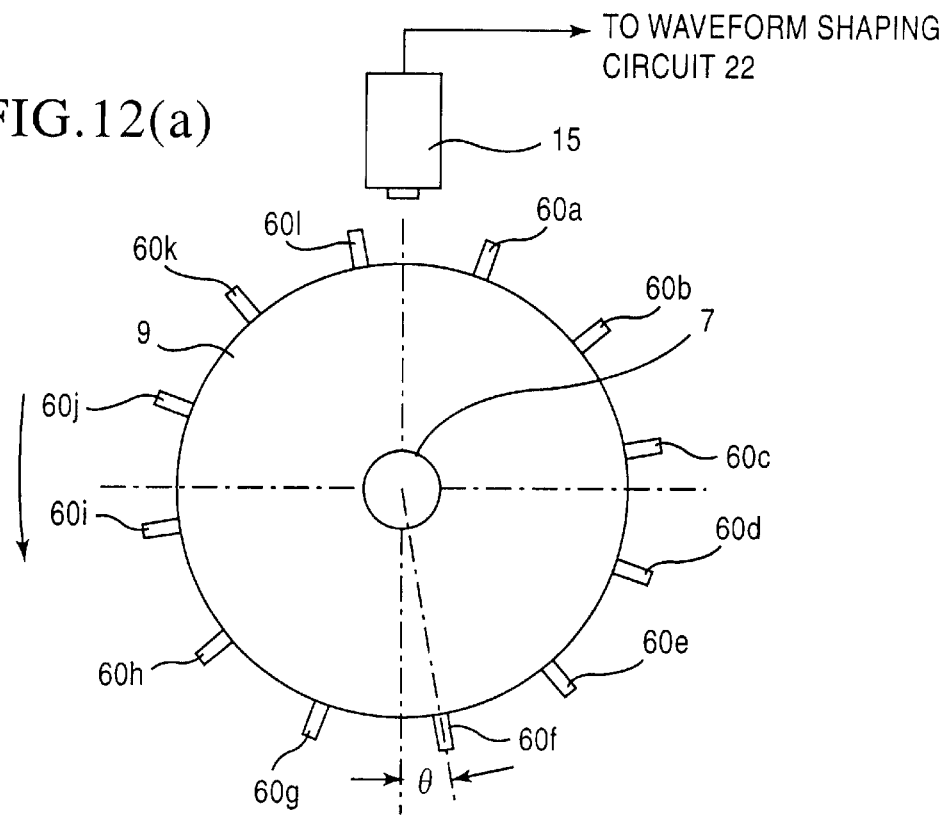
FIG. 12 is a schematic diagram of a third embodiment of an arrangement of magnetic protrusions on the first rotator and an arrangement of magnetic protrusions on the second rotator according to the present invention.
Figure 12B:
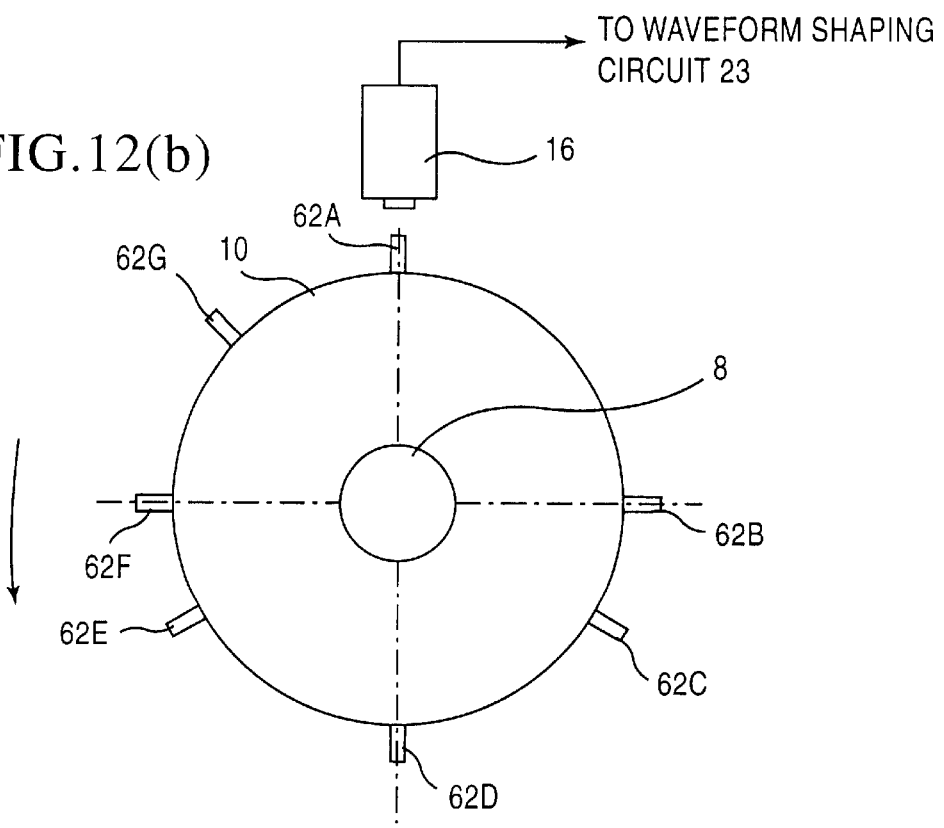

As shown in FIG. 12(a), on the periphery of the first rotator 9 on the crankshaft 7, twelve magnetic protrusions 60a–60l are provided as detectable parts at intervals of every 30° in the rotation direction. As shown in FIG. 12(b), on the periphery of the second rotator 10 on the camshaft 8 which rotates interlocking with the crankshaft 7, seven magnetic protrusions 62A–62G are provided as detectable parts in such a way that no two adjoining spaces between magnetic protrusions are the same, such as 90° between 62A and 62B, 30° between 62B and 62C, 60° between 62C and 62D, 60° between 62D and 62E, 30° between 62E and 62F, 45° between 62F and 62G, and 45° between 62G and 62A. Similarly to the first and second rotators shown in FIG. 2, the first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, 2:1 as in the case shown in FIG. 2.

In the third embodiment, the detectable parts on the first rotator are provided at regular intervals and the maximum space between adjoining detectable parts is 30°. The minimum interval between adjoining detectable parts provided on the second rotator is 30° between 62B and 62C or between 62E and 62F. As described above, the revolution ratio of the first rotator to that of the second rotator is 2. Accordingly, in the third embodiment, the value obtained by multiplying 30°, the minimum interval on the second rotator, by 2, the ratio of revolution, is larger than the maximum interval on the first rotator.

FIG. 13 shows the relation of the angle space between magnetic protrusions on the second rotator shown in FIG. 12 to the pulse number of a crank pulse signal counted as the count value in the section, and stage numbers determined from preceding values and present values. Each of the rows in the tables in FIGS. 13(a) and 13(b) is the same as in FIG. 7.

Shown in the second row of FIG. 13(a) are angle intervals between two consecutive adjoining magnetic protrusions on the second rotator shown in FIG. 12(b). The number of pulses as crank pulse signals as shown in the third row is counted during the time for detecting two adjoining magnetic protrusions by a crank pulse interrupt routine which is similar to the subroutine shown in FIG. 4. In the third embodiment, step S15 of the crank pulse interrupt routine shown in FIG. 4 carries out the crank pulse interrupt routine by deciding whether the value of the stage number is below 24 or not. By providing the angle spaces between the magnetic protrusions on the second rotator in the manner as described above, the number of crank pulses can be counted accurately even though the space between magnetic protrusions on the first rotator is 30°.

Figure 14:
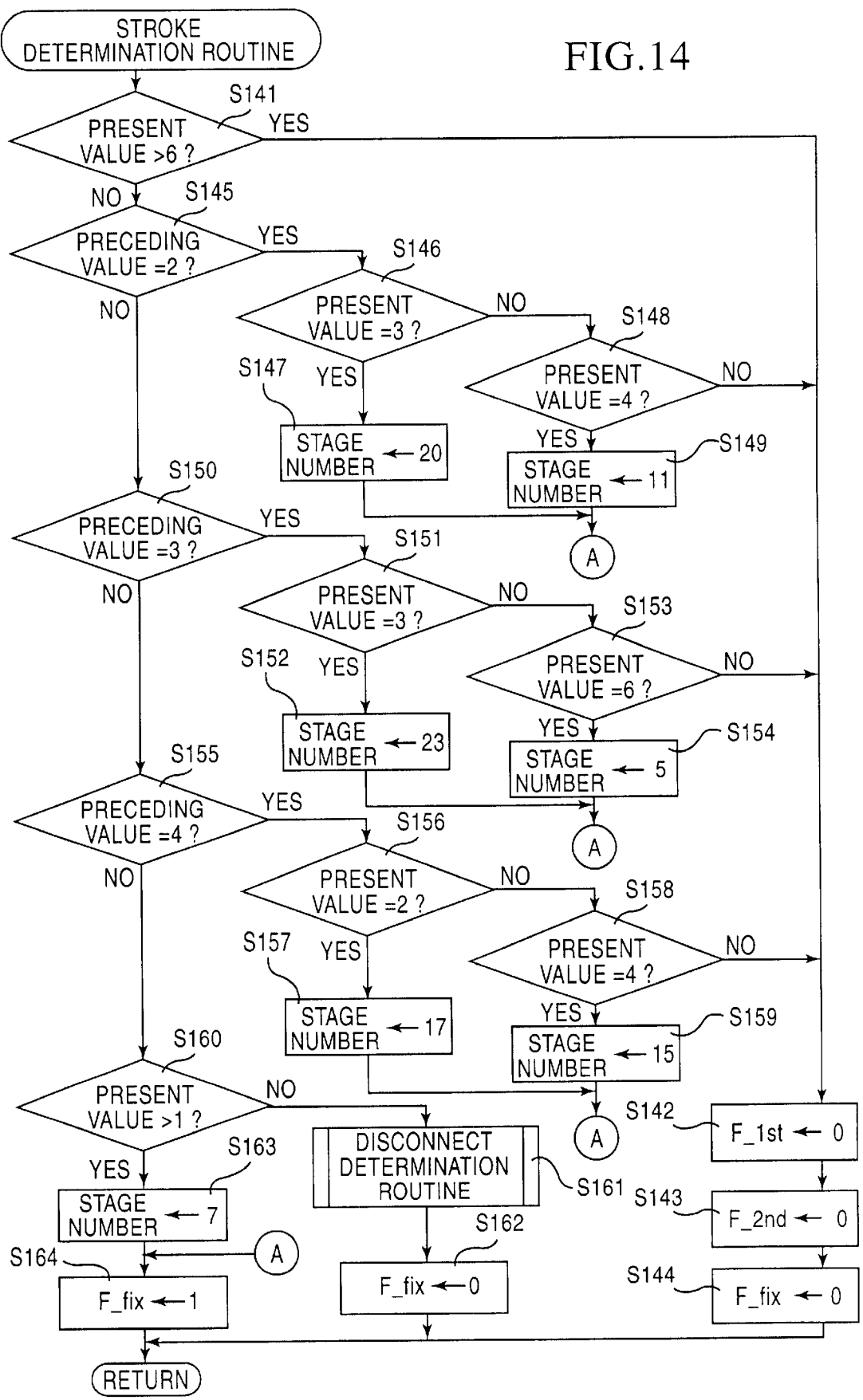
FIG. 14 is a flow chart of a subroutine for determining the stroke of the internal combustion engine on the basis of the preceding value and the present value when the first and second rotators shown in FIG. 12 are used in a 4-cylinder internal combustion engine.

As shown in FIG. 13(b), the stage number can be determined by carrying out the stroke determination routine as shown in FIG. 14 according to the preceding values and the present values obtained from the number of pulses as crank pulse signals. The stroke determination routine shown in FIG. 14 is similar to the subroutine shown in FIG. 5 and is carried out when the first and second rotators shown in FIG. 12 are used in a 4-cylinder internal combustion engine to be described.

Figure 15:
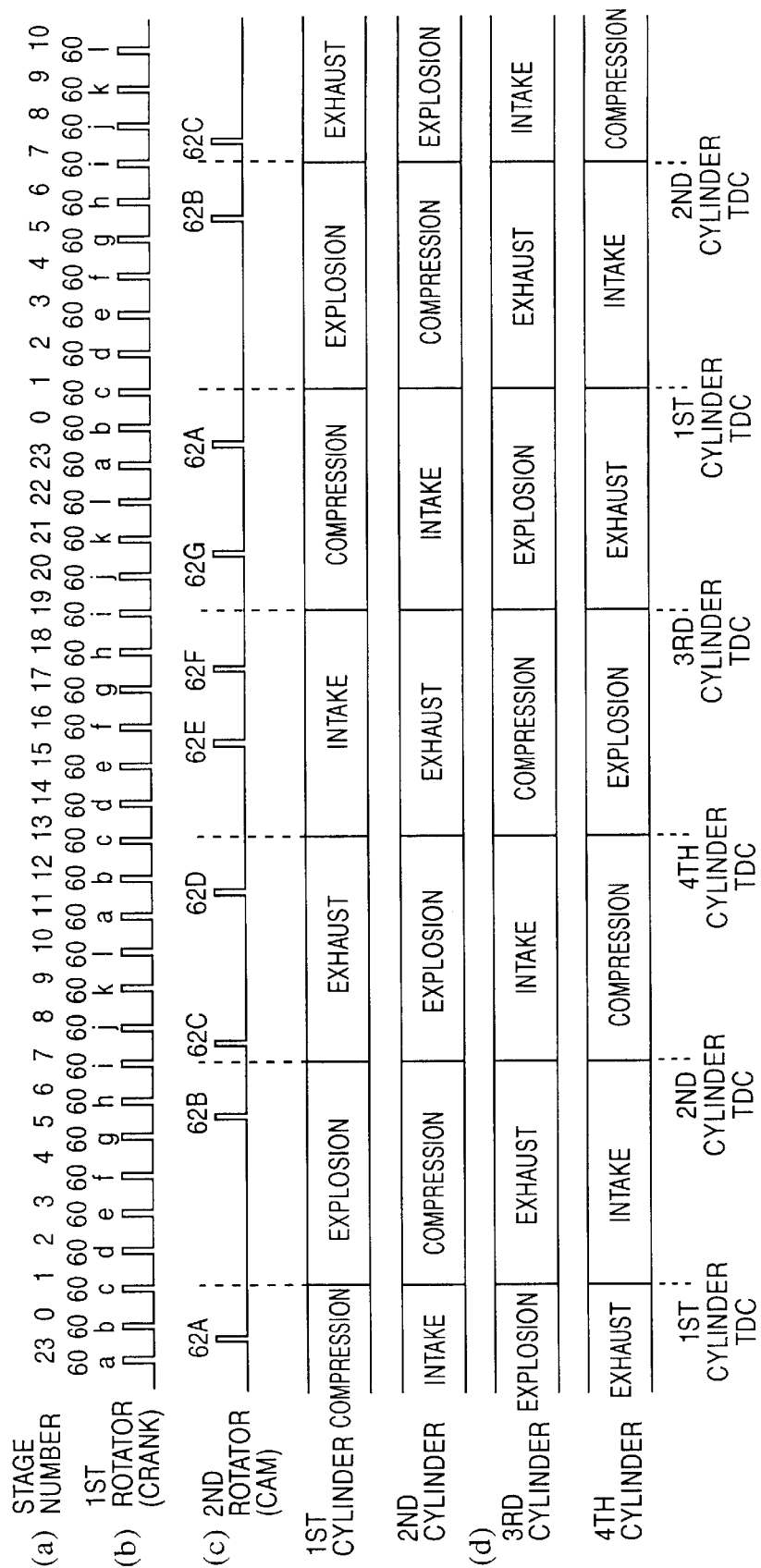
FIG. 15 is a time chart of an example of the engine stroke when the first and second rotators shown in FIG. 12 are used in a 4-cylinder internal combustion engine.

FIG. 15 shows an example of the engine stroke when the first and second rotators shown in FIG. 12 are used in a 4-cylinder internal combustion engine.

In this case, too, the stage number of the internal combustion engine can be determined at the point of time when the pulse which is transmitted when three pulses as cam pulse signals, for example, for magnetic protrusions 62A, 62B, and 62C are detected as shown in FIG. 15(c), is detected. It is determined that, for example, the TDC position is TDC of the first cylinder when the stage number is 1, TDC of the second cylinder when the stage number is 7, TDC of the fourth cylinder when the stage number is 13, and TDC of the third cylinder when the stage number is 19.

Figure 16:
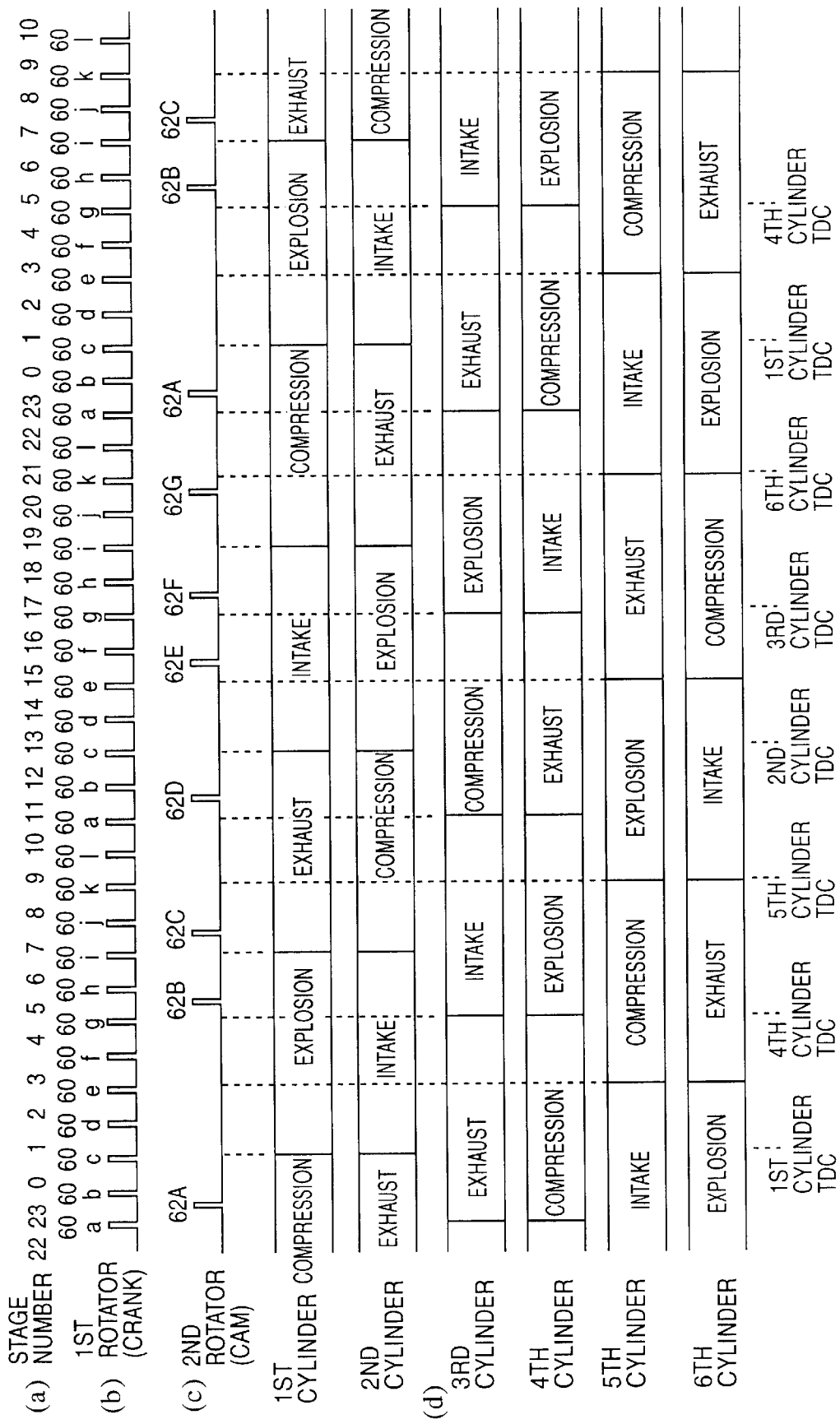
FIG. 16 is a time chart of an example of the engine stroke when the first and second rotators shown in FIG. 12 are used in a 6-cylinder internal combustion engine.

FIG. 16 shows an example of the engine stroke when the first and second rotators shown in FIG. 12 are used in a 6-cylinder internal combustion engine.

Similarly to the case shown in FIG. 15, the stage number of the internal combustion engine can be determined at the point of time when three pulses as cam pulse signal are detected. For example, it is determined that the TDC position is TDC of the first cylinder when the stage number is 1, TDC of the fourth cylinder when the stage number is 5, TDC of the fifth cylinder when the stage number is 9, TDC of the second cylinder when the stage number is 13, TDC of the third cylinder when the stage number is 17 and TDC of the sixth cylinder when the stage number is 21.

Figure 17:
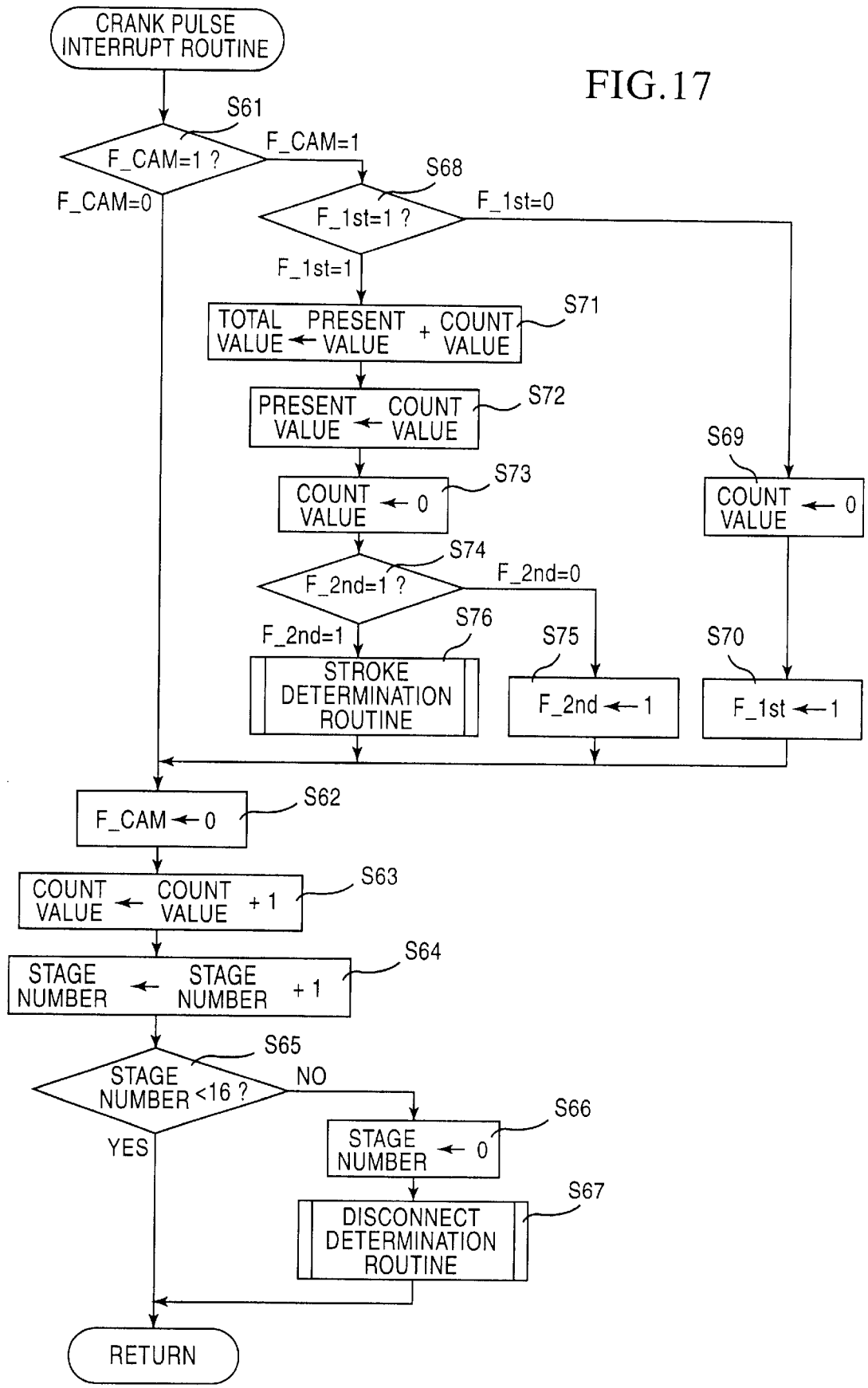
FIG. 17 is a flow chart of a subroutine carried out by the interrupt processing when generation of a crank pulse signal is detected.

FIG. 17 is a flow chart of a subroutine for obtaining the present value and total value generated by the interrupt processing when a crank pulse signal is sent. This subroutine is carried out when the first and second rotators shown in FIG. 2 are used in a 4-cylinder internal combustion engine.

This subroutine is similar to the subroutine shown in FIG. 4 but with steps S21 and S22 in FIG. 4 being replaced by steps S71 and S72. Instead of a preceding value, the total value is obtained from the count value as the sum of the preceding value and present value. The total values are shown in the fourth row of each of the described tables shown in FIGS. 7(b), 9(b), 13(b) and FIGS. 20(b), 25(b) to be described.

Figure 18:
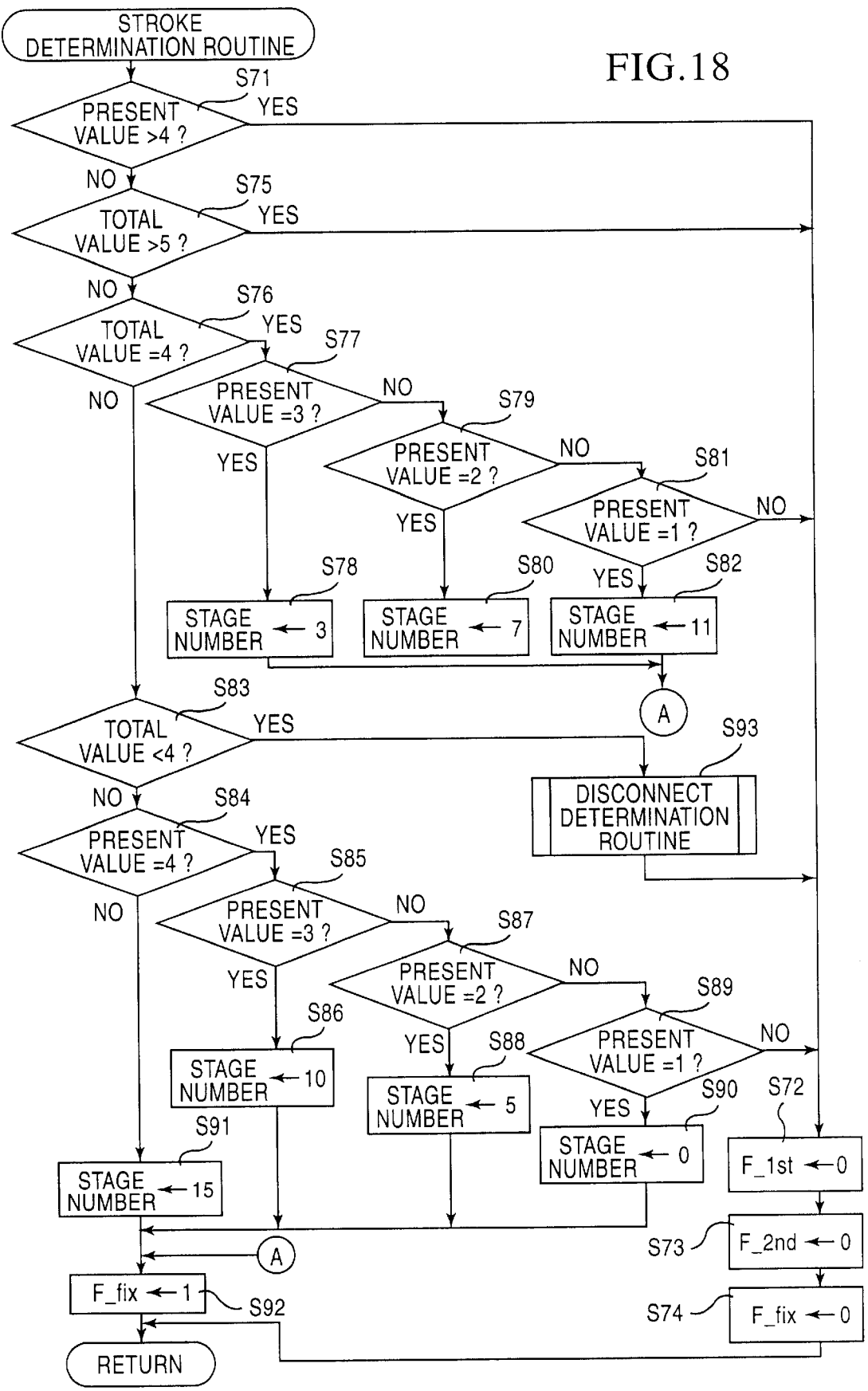
FIG. 18 is a flow chart of a subroutine for determining the stroke of the internal combustion engine on the basis of the present value and total value.

FIG. 18 is a flow chart of a subroutine for determining the stroke determination of the internal combustion engine according to the present value and the total value. This subroutine is carried out when the first and second rotators shown in FIG. 2 are used in a 4-cylinder internal combustion engine, as in FIG. 17.

Whether the present value is larger than 4 or not is decided first (step S71). If the present value is determined to be larger than 4, the value of flag F__1st is set to 0 (step S72), the value of flag F__2nd is set to 0 (step S73), the value of flag F__fix is set to 0 (step S74) and the subroutine is terminated.

If the present value is determined to be 4 or less in step S71, whether the total value is larger than 5 or not is decided (step S75). If the total value is determined to be larger than 5, the process in steps S72–S74 described above is carried out before the subroutine is terminated. In step S71, if the total value is determined to be 5 or less, whether the total value is 4 or not is decided (step S76). If the total value is determined to be 4, whether the present value is 3 or not is decided (step S77). If the present value is determined to be 3, the stage number is set to 3 (step S78). If the present value is determined not to be 3 in step S77, whether the present value is 2 or not is decided (step S79). If the present value is determined to be 2, the stage number is set to 7 (step S80). If the present value is determined not to be 2 in step S79, whether the present value is 1 or not is decided (step S81). If the present value is determined to be 1, the stage number is set to 11 (step S82). When the stage number is determined, the value of flag F__fix is set to 1 (step S92) and the subroutine is terminated. If the present value is determined to be 1 in step S81, the subroutine is terminated after carrying out steps S72–S74.

If the total value is determined not to be 4 in step S76, whether the total value is smaller than 4 or not is decided (step S83). If the total value is determined to be smaller than 4, the subroutine is terminated after carrying out the disconnect determination routine (step S93), and steps S72–S74. If the total value is determined to be 4 or more in step S83, whether the present value is 4 or not is decided (step S84). If the present value is determined to be 4, the stage number is set to 15 (step S91). If the present value is determined not to be 4 in step S84, whether the present value is 3 or not is decided. (step S85). If the present value is determined to be 3, the stage number is set to 10 (step S86). If the present value is determined not to be 3 in step S85, whether the present value is 2 or not is decided (step S87). If the present value is determined to be 2, the stage number is set to 5 (step S88). If the present value is determined not to be 2 in step S87, whether the present value is 1 or not is decided (step S89). If the present value is determined to be 1, the stage number is set to 0 (step S88). If the present value is determined not to be 2 in step S87, the subroutine is terminated after carrying out steps S72–S74. When the stage number is successfully determined, the value of flag F__fix is set to 1 (step S92) and the subroutine is terminated.

FIG. 19 shows a fourth embodiment of an arrangement of magnetic protrusions on the first rotator and an arrangement of magnetic protrusions on the second rotator according to the present invention. The same reference symbols are given to the components corresponding to those shown in FIG. 2.

Figure 19A:
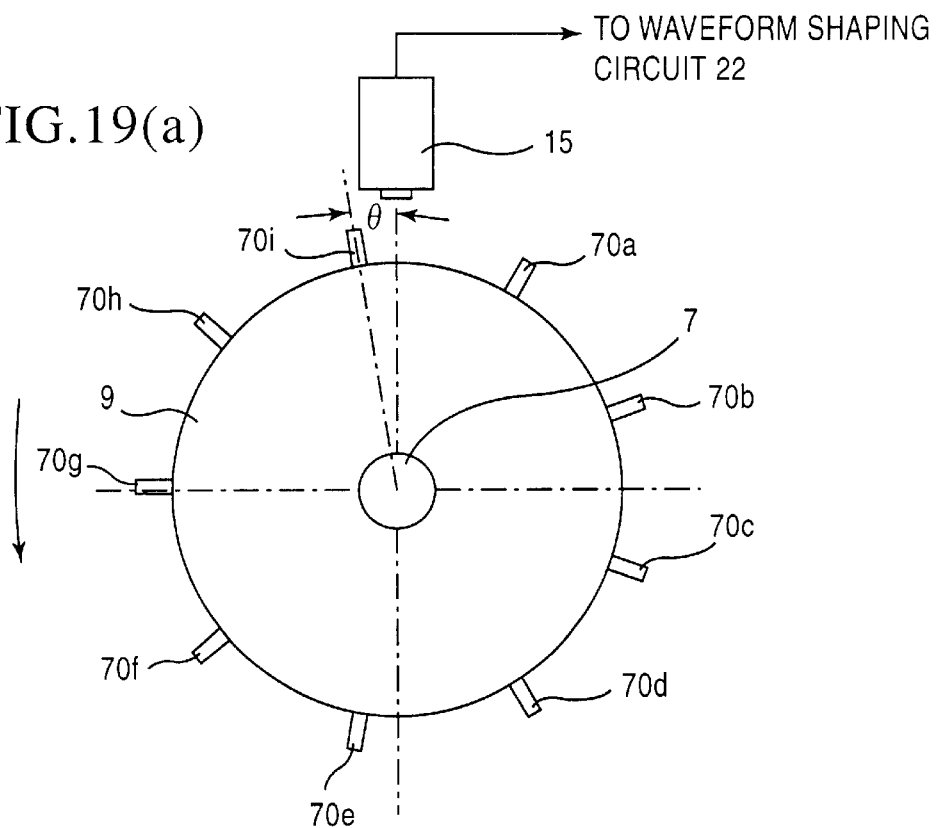
FIG. 19 is a schematic diagram of a fourth embodiment of an arrangement of magnetic protrusions on the first rotator and an arrangement of magnetic protrusions on the second rotator according to the present invention.
Figure 19B:
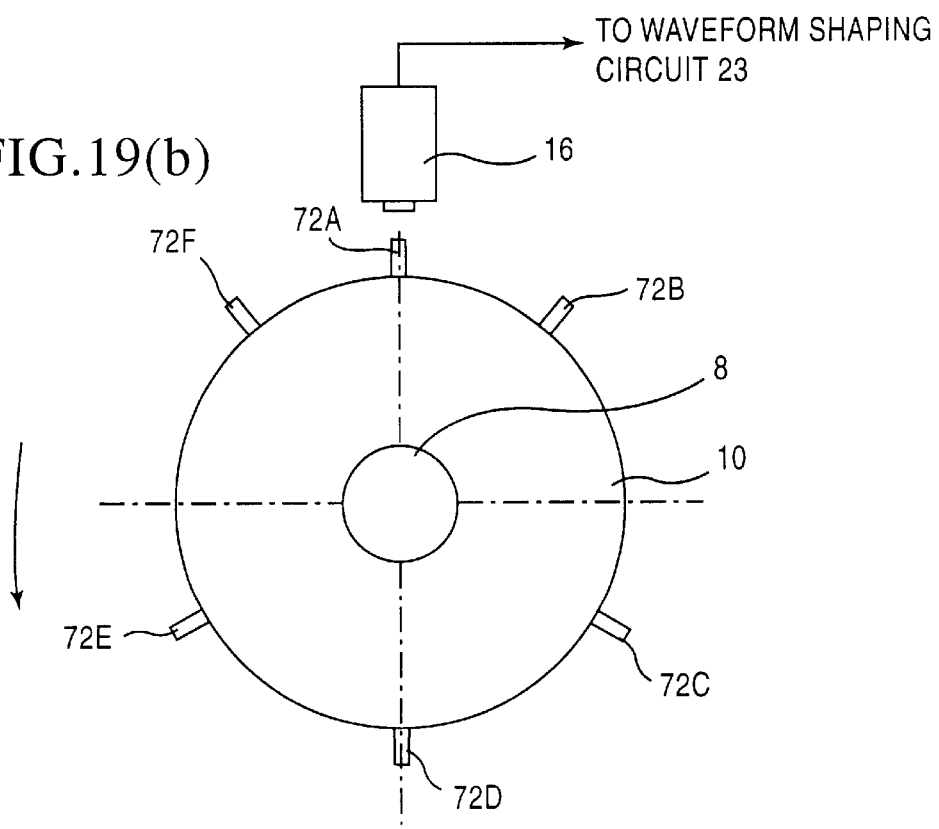

As shown in FIG. 19(a), on the periphery of the first rotator 9 on the crankshaft 7, nine magnetic protrusions 70a–70i are provided as detectable parts at regular intervals of 40° in the rotation direction. As shown in FIG. 19(b), in the periphery of the second rotator 10 on the camshaft 8, which rotates interlocking with the crankshaft 7, six magnetic protrusions 72A–72F are provided as detectable parts in such a way that no two adjoining spaces between magnetic protrusions are the same such as 40° between 72A and 72B, 80° between 72B and 72C, 60° between 72C and 72D, 60° between 72D and 72E, 80° between 72E and 72F and 40° between 72F and 72A. As with the first and second rotators shown in FIG. 2, the first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, 2:1 as in the case shown in FIG. 2.

In the fourth embodiment, the detectable parts on the first rotator are provided at regular intervals and the maximum interval between adjoining detectable parts is 40°. The minimum interval between adjoining detectable parts provided on the second rotator is 40° between 72A and 72B or between 72F and 72A. The revolution ratio of the first-rotator to that of the second rotator is 2:1 as described above. Accordingly, in the fourth embodiment, the value obtained by multiplying 40°, the minimum space on the second rotator, by 2, the revolution ratio is larger than the maximum interval on the first rotator.

FIG. 20 shows the relation of the angle space between magnetic protrusions on the second rotator shown in FIG. 19 to the number of crank pulses counted as the count value in the section, and stage numbers determined from preceding values and present values. Each of the rows in the tables in FIGS. 20(a) and 20(b) is the same as in the tables in FIG. 7.

The angle intervals between two consecutive adjoining magnetic protrusions on the second rotator shown in FIG. 19(b) are given in the second row of FIG. 20(a). The number of crank pulses as shown in the third row is counted during the time for detecting two adjoining magnetic protrusions by a crank pulse interrupt routine which is similar to the subroutine shown in FIGS. 4 or 17. In the fourth embodiment, step S15 or S65 in the crank pulse interrupt routine shown in FIGS. 4 or 17 carries out the crank pulse interrupt routine to decide whether the value of the stage number is below 18 or not. By providing the angle intervals between magnetic protrusions on the second rotator in the manner described above, the number of crank pulses can be counted accurately even though the interval between magnetic protrusions on the first rotator is 40°.

Figure 21:
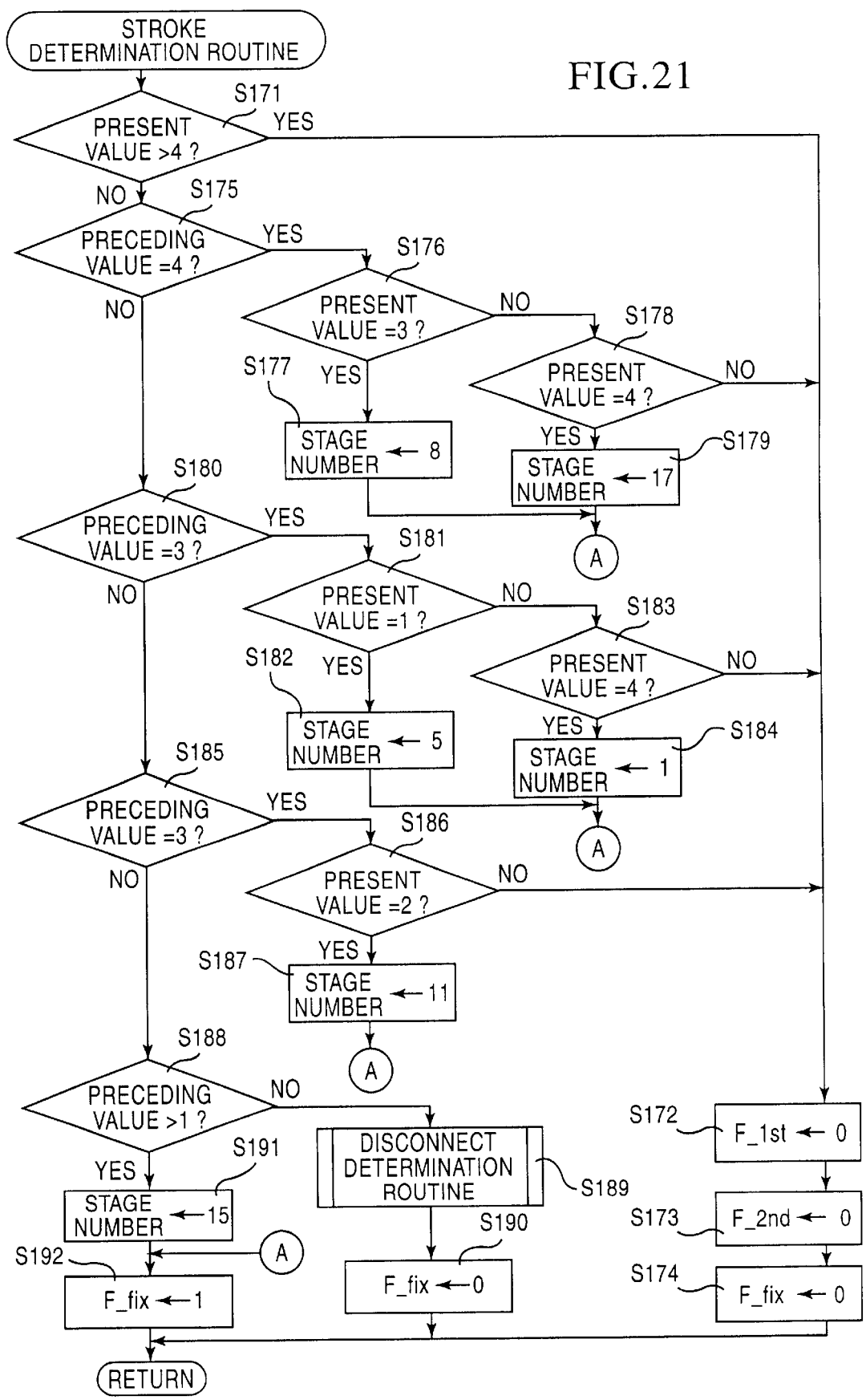
FIG. 21 is a flow chart of a subroutine for determining the stroke of the internal combustion engine on the basis of the preceding value and the present value when the first and second rotators shown in FIG. 19 are used in a 4-cylinder internal combustion engine.
Figure 22:
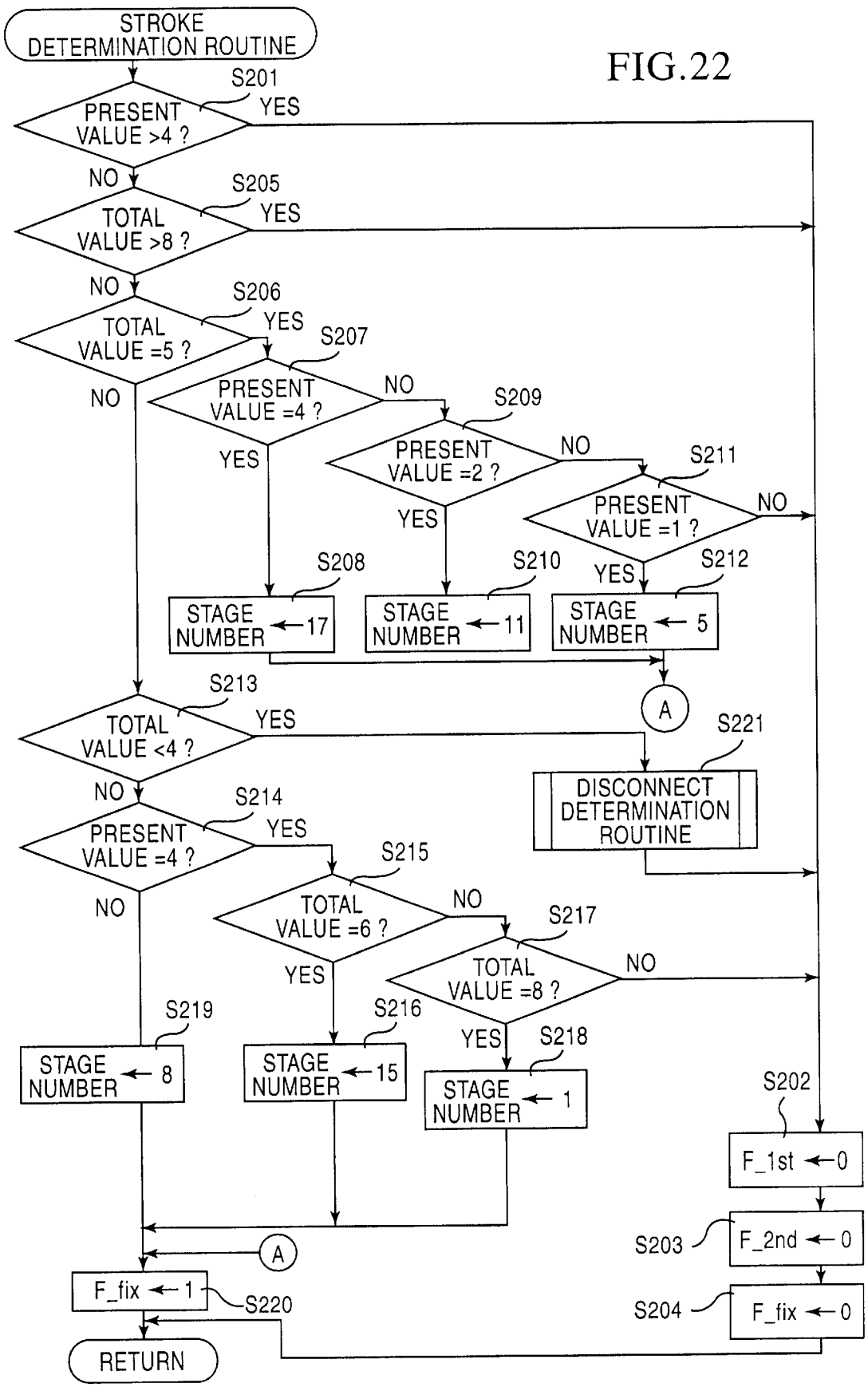
FIG. 22 is a flow chart of a subroutine for determining the stroke of the internal combustion engine on the basis of the present value and the total value when the first and second rotators shown in FIG. 19 are used in a 4-cylinder internal combustion engine.

As shown in FIG. 20(b), the stage number can be determined by obtaining the preceding value, present value and total value for the number of crank pulses, then carrying out the stroke determination routine as shown in FIGS. 21 and 22. The stroke determination routine shown in FIG. 21 is similar to the subroutine shown in FIG. 5, and the stroke determination routine shown in FIG. 22 is similar to the subroutine shown in FIG. 18. The stroke determination routine shown in FIGS. 21 and 22 is carried out when the first and second rotators shown in FIG. 19 are used in a 6-cylinder internal combustion engine to be described.

Figure 23:
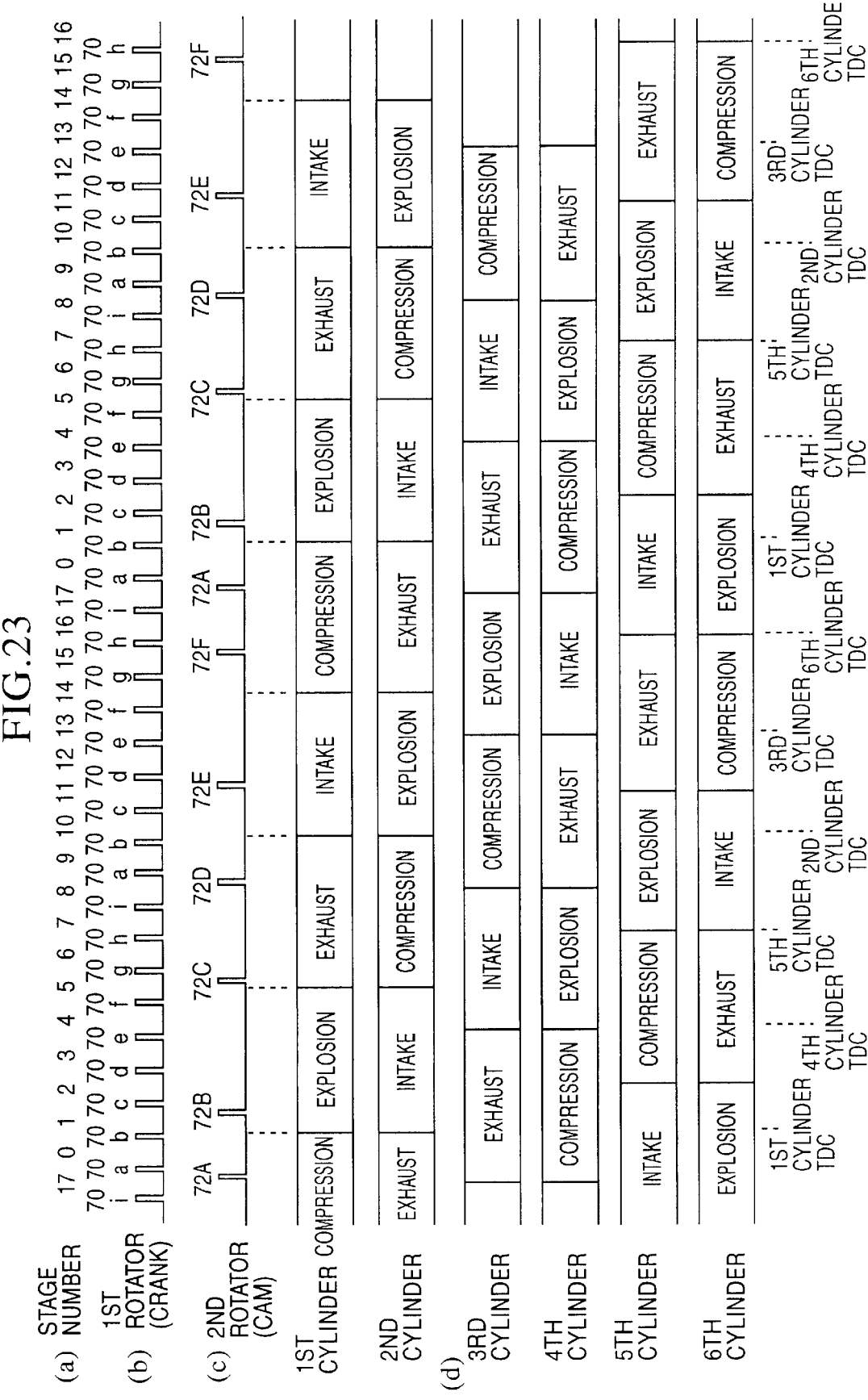
FIG. 23 is a diagram of an example of the engine stroke when the first and second rotators shown in FIG. 19 are used in a 6-cylinder internal combustion engine.

FIG. 23 shows an example when the first and second rotators shown in FIG. 19 are used in a 6-cylinder internal combustion engine.

In this example, too, the stage number of the internal combustion engine can be determined at the point of time when three cam pulses are detected. For example, it can be determined that the TDC position is TDC of the first cylinder when the stage number is 1, TDC of the fourth cylinder when the stage number is 4, TDC of the fifth cylinder when the stage number is 7, TDC of the second cylinder when the stage number is 10, TDC of the third cylinder when the stage number is 13, and TDC of the sixth cylinder when the stage number is 16.

FIG. 24 shows a fifth embodiment of an arrangement of magnetic protrusions on the first rotator and an arrangement of magnetic protrusions on the second rotator according to the present invention. The same reference symbols are given to the components corresponding to those shown in FIG. 2.

Figure 24A:
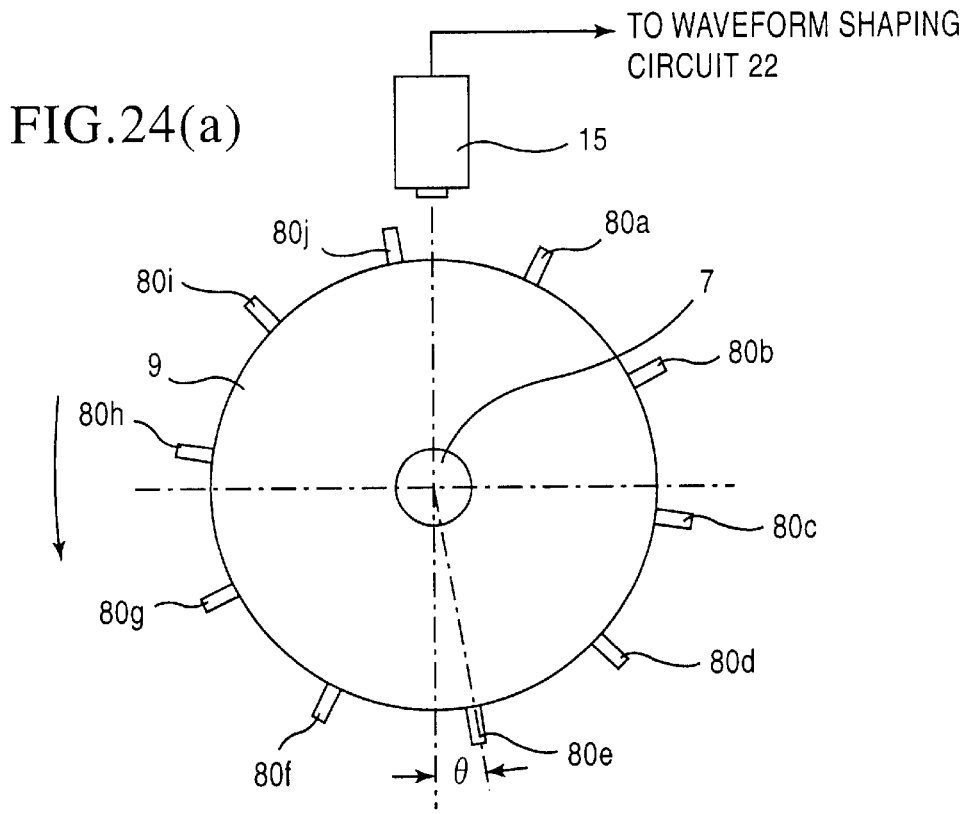
FIG. 24 is a schematic diagram of a fifth embodiment of an arrangement of magnetic protrusions on the first rotator and an arrangement of magnetic protrusions on the second rotator according to the present invention.
Figure 24B:
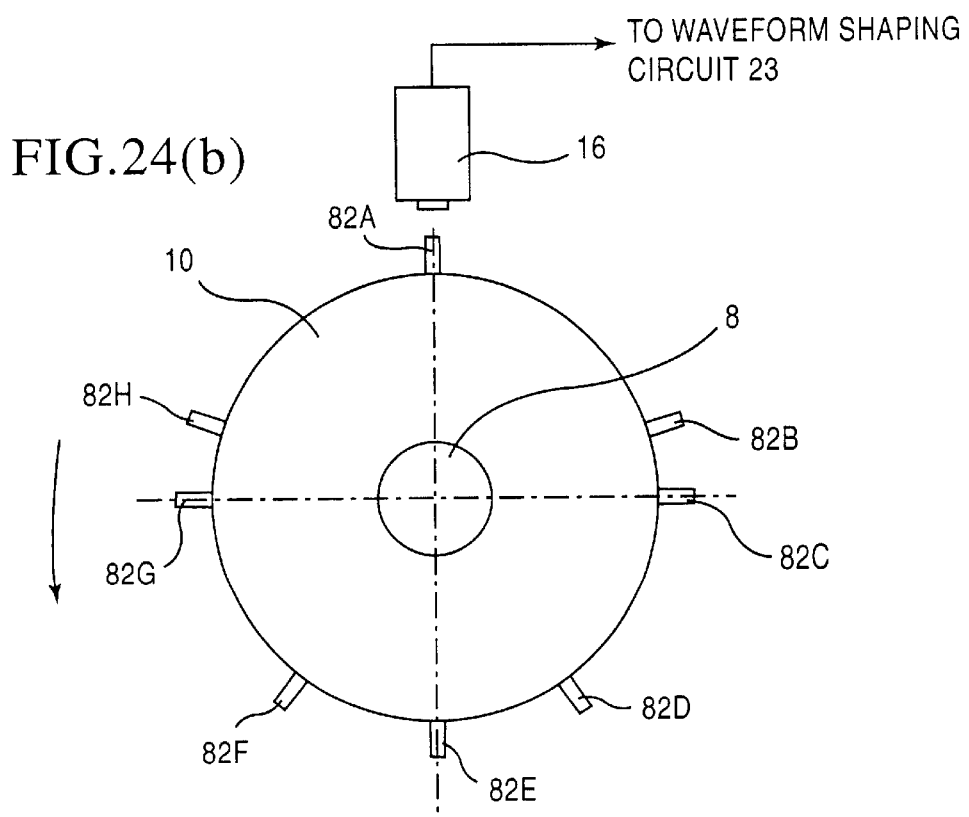

As shown in FIG. 24(a), ten magnetic protrusions 80a–80j are provided as detectable parts at regular intervals of 36° in the rotation direction in the periphery of the first rotator 9 on the crankshaft 7. As shown in FIG. 24(b), in the periphery of the second rotator 10 on the camshaft 8, which rotates interlocked with the crankshaft 7, eight magnetic protrusions 82A–82H are provided as detectable parts in such a way that no two adjoining intervals between magnetic protrusions are the same such as 72° between 82A and 82B, 18° between 82B and 82C, 54° between 82C and 82D, 36° between 82D and 82E, 36° between 82E and 82F, 54° between 82F and 82G, 18° between 82G and 82H and 72° between 82H and 82A. As with the first and second rotators shown in FIG. 2, the first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, 2:1, as in the case shown in FIG. 2.

In the fifth embodiment, the detectable parts on the first rotator are provided at regular intervals and the maximum interval between adjoining detectable parts is 36°. The minimum interval between adjoining detectable parts provided on the second rotator is 18° between 82B and 82C or between 82G and 82H. As described above, the revolution ratio of the first rotator to the second rotator is 2:1. Accordingly, in the fifth embodiment, the value obtained by multiplying 18°, the minimum interval on the second rotator, by 2, the revolution ratio, is equal to 36°, the maximum intervals on the first rotator.

FIG. 25 shows the relation of the angle space between magnetic protrusions on the second rotator shown in FIG. 24 to the number of crank pulses counted as the count value in the section, and stage numbers determined from preceding values, present values and total values.

The angle intervals between two consecutive adjoining magnetic protrusions on the second rotator shown in FIG. 24(b) are given in the second row of FIG. 25(a). The number of crank pulses as shown in the third row is counted during the time for detecting two adjoining magnetic protrusions by a subroutine which is similar to the crank pulse interrupt routine shown in FIGS. 4 or 17. In the fifth embodiment, step S15 or S65 in the crank pulse interrupt routine shown in FIGS. 4 or 17 carries out the crank pulse interrupt routine to decide whether the value of the stage number is below 20 or not. The number of crank pulses is accurately counted even though the interval between magnetic protrusions on the first rotator is 36° by providing the angle intervals between magnetic protrusions on the second rotator in the manner described above.

Figure 26:
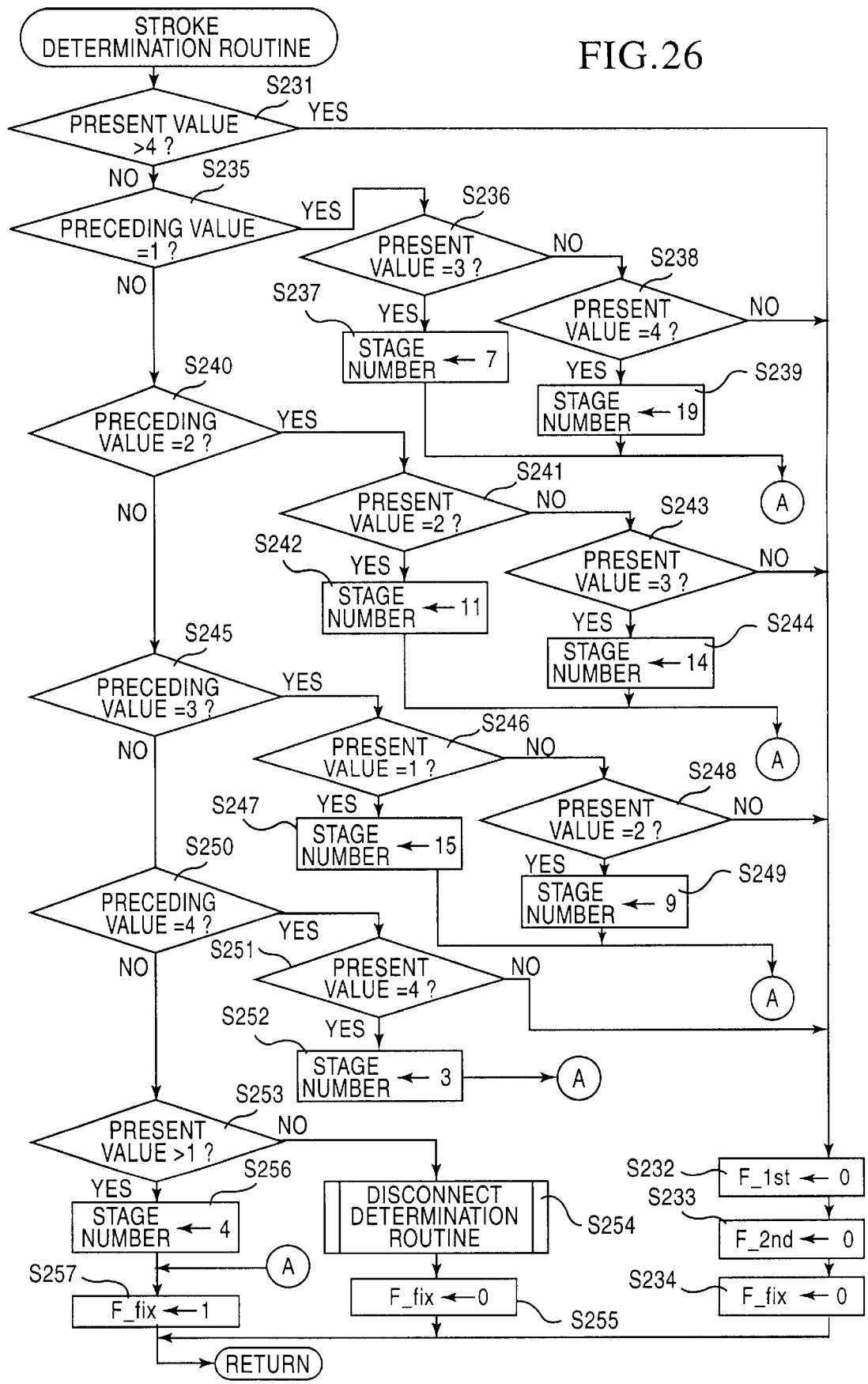
FIG. 26 is a flow chart of a subroutine for determining the stroke of the internal combustion engine according to the preceding value and the present value when the first and second rotators shown in FIG. 24 are used in a 4-cylinder internal combustion engine.
Figure 27:
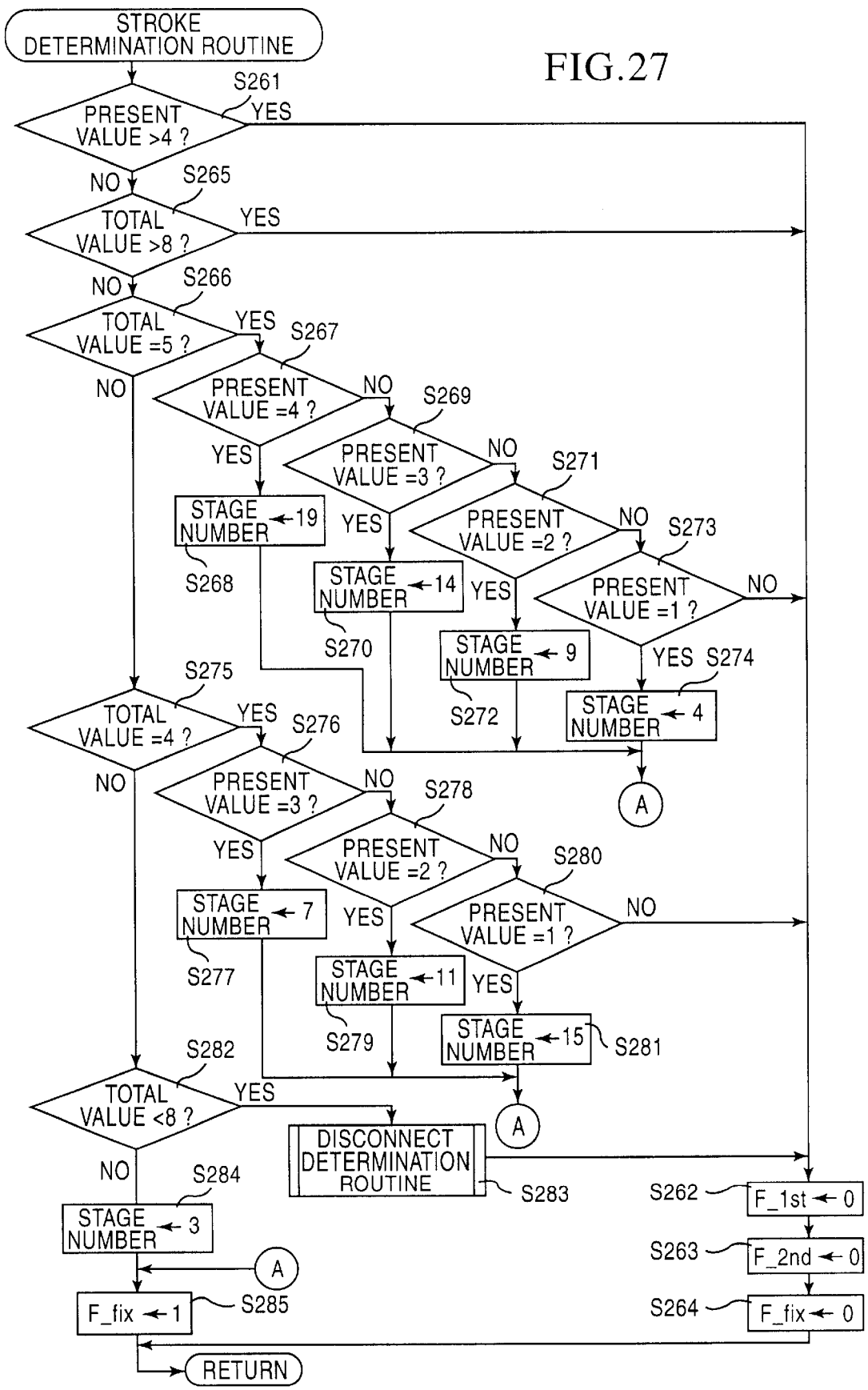
FIG. 27 is a flow chart of a subroutine for determining the stroke of an internal combustion engine on the basis of the present value and the total value when the first and second rotators shown in FIG. 24 are used in a 4-cylinder internal combustion engine.

As shown in FIG. 25(b), the stage number can be determined by obtaining preceding values, present values and total values for the number of crank pulses, then carrying out the stroke determination routine as shown in FIG. 26 or FIG. 27. The stroke determination routine shown in FIG. 26 is similar to the subroutine shown in FIG. 5, and the stroke determination routine shown in FIG. 27 is similar to the subroutine shown in FIG. 18. The stroke determination routine shown in FIGS. 26 and 27 is carried out when the first and second rotators shown in FIG. 24 are used in a 4-cylinder internal combustion engine to be described.

Figure 28:
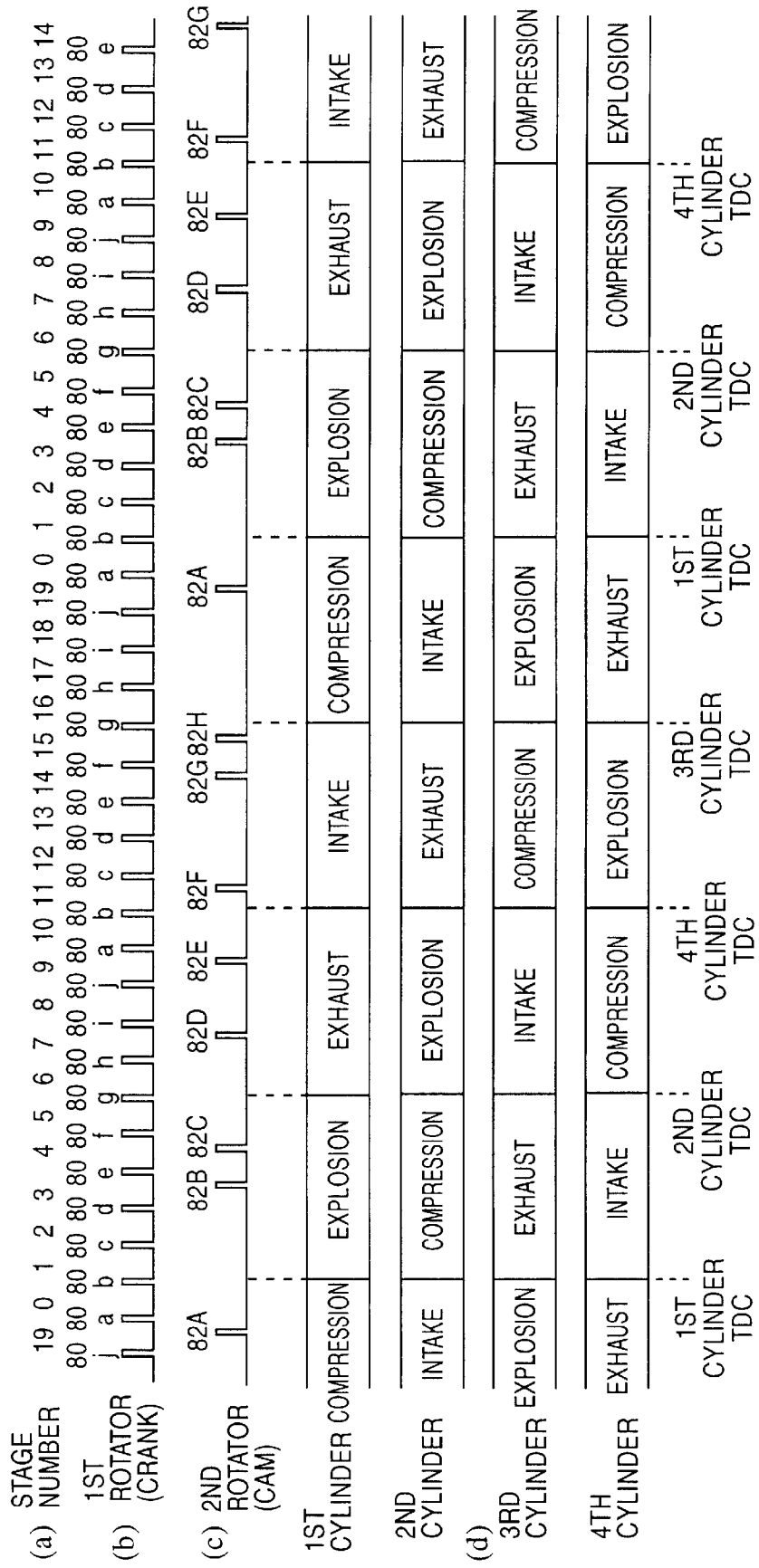
FIG. 28 is a diagram of an example of the engine stroke when the first and second rotators shown in FIG. 24 are used in a 4-cylinder internal combustion engine.

FIG. 28 shows an example of the engine stroke when the first and second rotators shown in FIG. 24 are used in a 4-cylinder internal combustion engine.

In this example, too, the stage number of the internal combustion engine can be determined at the point of time when three cam pulses are detected. For example, it can be determined that the TDC position is TDC of the first cylinder when the stage number is 1, TDC of the second cylinder when the stage number is 6, TDC of the fourth cylinder when the stage number is 11, and TDC of the third cylinder when the stage number is 16.

FIG. 29 shows a sixth embodiment of an arrangement of magnetic protrusions on the first rotator and an arrangement of magnetic protrusions on the second rotator according to the present invention. The same reference symbols are given to the components corresponding to those shown in FIG. 2.

Figure 29A:
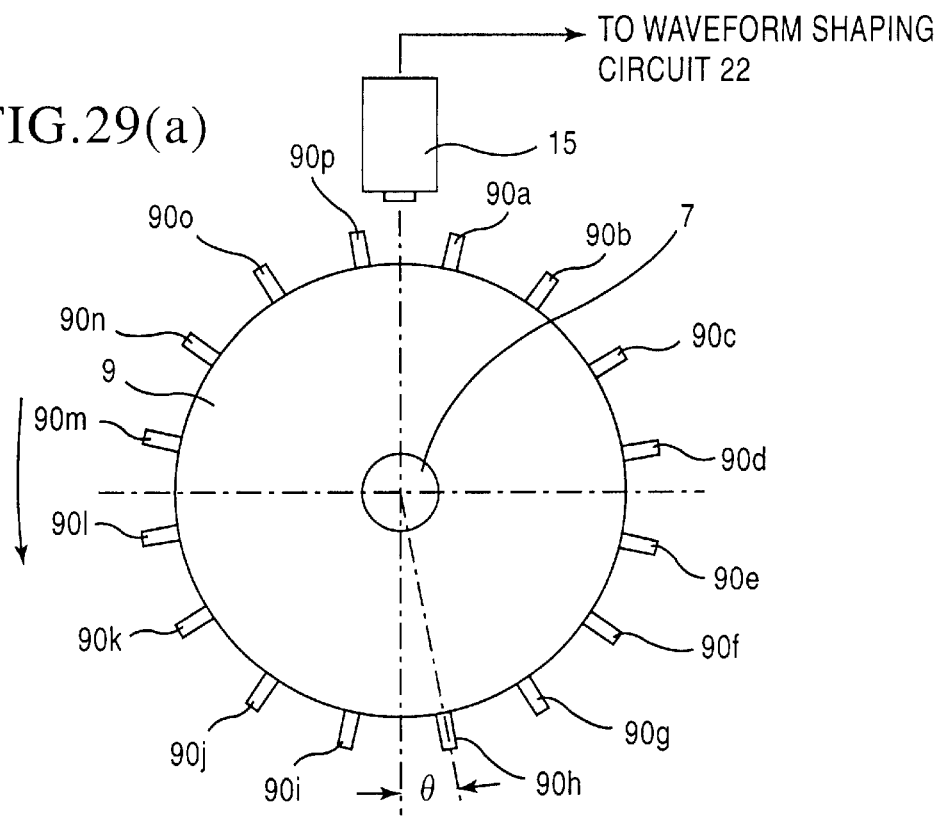
FIG. 29 is a diagram of a sixth embodiment of an arrangement of magnetic protrusions on the first rotator and an arrangement of magnetic protrusions on the second rotator according to the present invention.
Figure 29B:
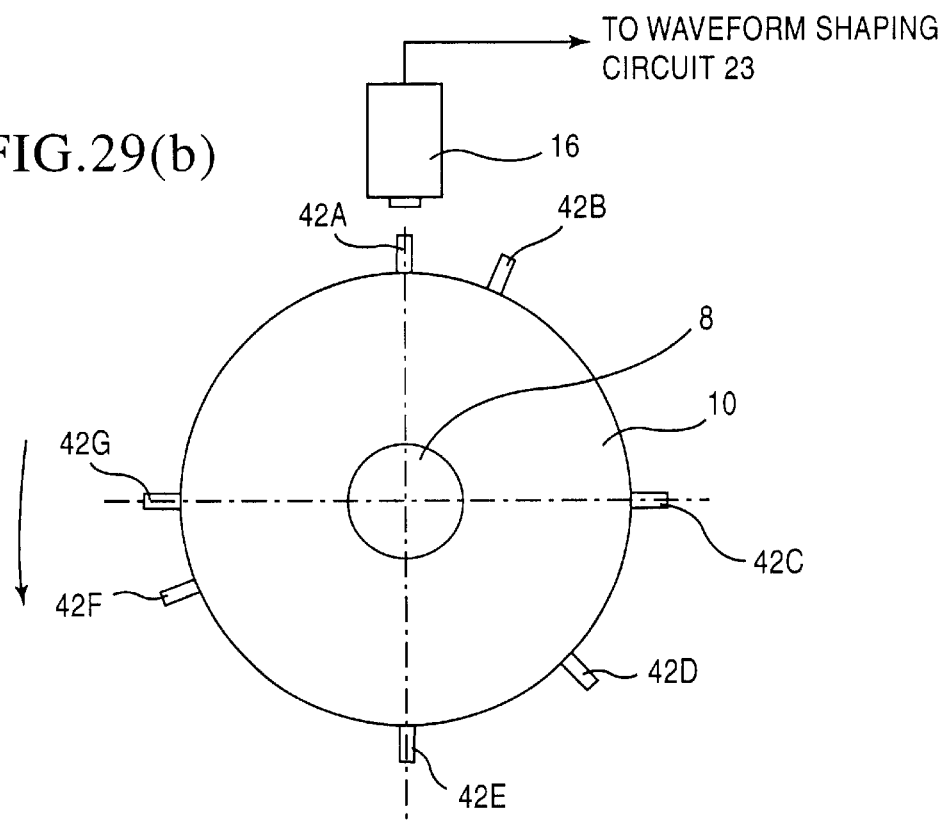

As shown in FIG. 29(a), sixteen magnetic protrusions 90a–90p are provided as detectable parts at regular intervals of 22.5° in the rotation direction in the periphery of the first rotator 9 on the crankshaft 7. The second rotator 10 shown in FIG. 29(b) is similar to the second rotator shown in FIG. 2(b). The first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, at the ratio of 2:1, as in the case shown in FIG. 2.

In the sixth embodiment, the detectable parts on the first rotator are provided at regular intervals and the maximum interval between adjoining detectable parts is 22.5°. The minimum interval between adjoining detectable parts provided on the second rotator is 22.5° between 42A and 42B or between 42F and 42G. As described above, the revolution ratio of the first rotator to the second rotator is 2:1. Accordingly, in the second embodiment, the value obtained by multiplying 22.5°, the minimum interval on the second rotator, by 2, the ratio of revolution, is larger than the maximum interval on the first rotator.

FIG. 30 shows a seventh embodiment of an arrangement of magnetic protrusions on the first rotator and an arrangement of magnetic protrusions on the second rotator according to the present invention. The same reference symbols are given to the components corresponding to those shown in FIG. 2.

As shown in FIG. 30(a), twenty-four magnetic protrusions 100a–100x are provided as detectable parts at regular intervals of 15° in the rotation direction on the periphery of the first rotator 9 on the crankshaft 7. The second rotator 10 shown in FIG. 30(b) is similar to the second rotator shown in FIG. 2(b). The first rotator 9 is provided at a position biased by the predetermined angle θ to the crankshaft 7 in the rotation direction. The rotation of the crankshaft 7 is transmitted to the camshaft 8 after being decelerated at a predetermined speed reduction ratio, for example, at the ratio of 2:1, as in the case shown in FIG. 2.

In the seventh embodiment, the detectable parts on the first rotator are provided at regular intervals and the maximum interval between adjoining detectable parts is 15°. The minimum interval between adjoining detectable parts provided on the second rotator is 22.5° between 42A and 42B or between 42F and 42G. As described above, the revolution ratio of the first rotator to that of the second rotator is 2. Accordingly, in the second embodiment, the value obtained by multiplying 22.5°, the minimum interval on the second rotator, by 2, the ratio of revolution, is larger than the maximum interval on the first rotator.

Figure 31:
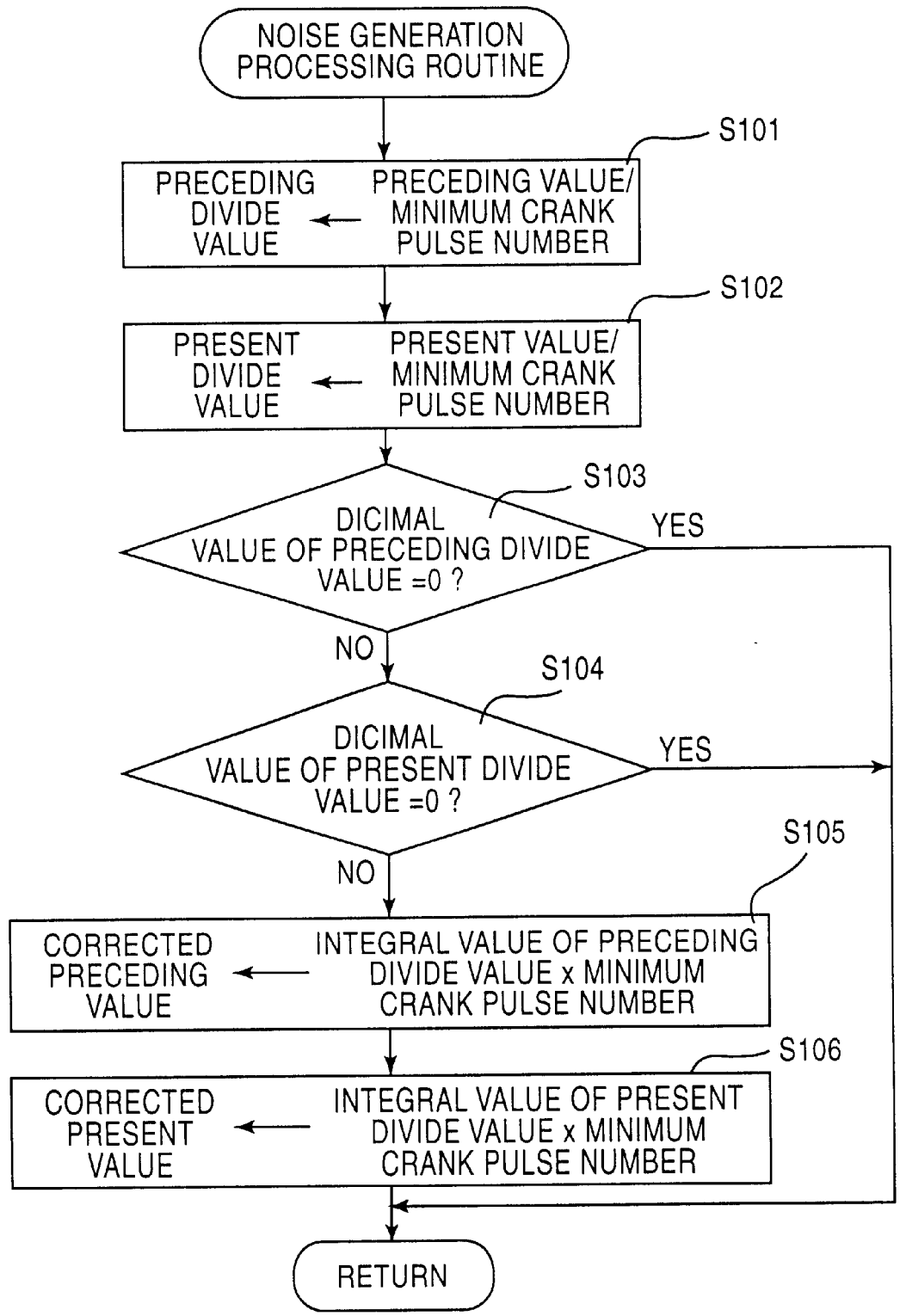
FIG. 31 is a flow chart of a subroutine carried out when a noise is generated.

FIG. 31 shows the subroutine that is carried out when a noise is generated.

First, a value is calculated as a preceding divide value by dividing the preceding value by the minimum crank pulse number N (step S101). The minimum crank pulse number N is a natural number of two or more which is the number of crank pulses detected at the minimum angle interval between magnetic protrusions provided on the second rotator. In the case of the first and second rotators shown in FIG. 29, for example, the minimum angle interval between magnetic protrusions provided on the second rotator is 22.5° between 42A and 42B or between 42F and 42G, and the number of crank pulses countable in this angle interval is 2. In the case of the first and second rotators shown in FIG. 30, the number of crank pulses countable in the minimum angle interval between 42A and 42B or between 42F and 42G on the second rotator is 3. That is, N=2 in the case of FIG. 29 and N=3 in the case of FIG. 30. In the same manner, a value is calculated as the present divide value by dividing the present value by the minimum crank pulse number N (step S102). Next, whether the value of the decimal part of the preceding divide value calculated in step S101 is 0 or not, that is, whether the remainder of the divided result is 0 or not, is decided (step S103). If the value of the decimal part of the preceding divide value is determined to be 0, the subroutine is immediately terminated. If the value of the decimal part of the preceding divide value is determined not to be 0, whether the value of the decimal part of the present divide value calculated in step S102 is 0 or not is decided (step S104). If the value of the decimal part of the present divide value is determined to be 0, the subroutine is immediately terminated. If the value of the decimal part of the present divide value is determined not to be 0, the value of the integral part of the preceding divide value, that is, the value, which has been corrected by multiplying the value of the preceding divide value with fractions discarded at 1 place by the minimum crank pulse number N, is substituted for the corrected preceding value (step S105), then the value which has been corrected by multiplying the value of the integral part of the present divide value by the minimum crank pulse number N is substituted for the corrected present value (step S106).

FIG. 32 shows the values for calculating the corrected preceding values and corrected present values when the first and second rotators shown in FIGS. 29 and 30 are used.

FIG. 32(a) shows the case when the first and second rotators shown in FIG. 29 are used. The protrusion numbers in the first row show the number of magnetic protrusions on the second rotator which are being detected at the present point in time. Shown in the second and third rows are the preceding values and present values when no noise is generated. Sections in parentheses in each line show sections between magnetic protrusions where preceding values and present values are obtained by counting cam pulses. Shown in the fourth and fifth rows are preceding values and present values obtained when a noise is generated once. The corrected preceding values and corrected present values shown in the sixth and seventh rows in FIG. 32(a) are obtained by carrying out the subroutine shown in FIG. 31. When a noise is generated once, the values can be corrected to preceding values and present values obtained when no noise is generated like the corrected preceding values and corrected present values shown in the sixth and seventh rows of FIG. 32(a).

FIG. 32(b) shows the case when the first and second rotators shown in FIG. 30 are used. The contents of each row in FIG. 32(b) are similar to those in FIG. 32(a). The preceding values and present values shown in the fourth and fifth rows of FIG. 32(b) are preceding values and present values obtained when a noise is generated twice. Because the corrected preceding values and corrected present values shown in the sixth and seventh rows of FIG. 32(b) are obtained by carrying out the subroutine shown in FIG. 31 according to the preceding values and present values, the values can be corrected to preceding values and present values which are obtained when no noise is generated even though the noise is generated twice.

By carrying out the subroutine shown in FIG. 31 using the first and second rotators shown in the FIG. 29 or FIG. 30, the preceding values and present values can be corrected when a noise is generated (minimum crank pulse number N−1) times at every angle interval.

In the above embodiment, the configuration is designed so that at least one crank pulse is detected without fail even in the minimum interval on the second rotator. Accordingly, disconnected circuits including the crank pulse sensor 15 and the cam pulse sensor circuit 16 can be determined by counting the number of crank pulses in the minimum interval on the second rotator. For example, disconnection may be determined by counting the number of pulses of the crank pulse signal in steps S17 in FIG. 4, S51 in FIG. 5, S67 in FIG. 17 and S93 in FIG. 18.

Shown in the embodiments described above are cases where the angle position of the first and second rotators is obtained by detecting the changes in magnetic flux emitted from magnetic protrusions. However, the configuration may be designed so that the angle position is obtained by the Hall element method or the optical method.

Industrial Applicability

As described above, an apparatus for detecting the crank angle position in an internal combustion engine according to the present invention can determine the stroke of the internal combustion engine in a short time by providing detected parts on the first rotator with adjoining intervals being nearly equal and providing detectable parts on the second rotator with no two adjoining intervals being the same, in one rotation direction.

What is claimed is:

1. An apparatus for detecting crank angle position in an internal combustion engine for detecting a rotational angle position of a crankshaft of the internal combustion engine, the engine having a camshaft which is interlocked with said crankshaft at a predetermined revolution ratio, wherein
    said crankshaft has a first rotator movable therewith and said camshaft has a second rotator movable therewith,
    each of said first rotator and second rotator has a plurality of detectable parts in a rotation direction thereof,
    Intervals between said detectable parts adjoining each other on said first rotator being almost equal, and
    permutations each consisting of at least two consecutive angle intervals between said detectable parts in one rotation direction on said second rotator are different from each other.

2. An apparatus for detecting crank angle position in the internal combustion engine according to claim 1, wherein in order to prevent sensor output signals from being transmitted simultaneously from sensors for detecting said detectable parts on said first and second rotators, a relative position of said detectable parts to said sensors is determined.

3. An apparatus for detecting crank angle position in the internal combustion engine according to claim 1, wherein a value obtained by multiplying a ratio of revolution of said camshaft to revolution of said crankshaft by a minimum interval between said detectable parts on said second rotator is larger than a maximum interval between said detectable parts on said first rotator.

4. An apparatus for detecting crank angle position in the internal combustion engine according to claim 3, wherein angle intervals between said detectable parts on said second rotator are obtained on an assumption that a value of said maximum interval divided by a natural number of two or more is the interval between said detectable parts on said first rotator, and that a number of sensor output signal pulses from a sensor which corresponds to said second rotator in said minimum interval is said natural number of two or more.

5. An apparatus for detecting crank angle position in an internal combustion engine according to claim 4, wherein at least three of said detectable parts are provided on said second rotator within the rotational angle thereof which corresponds to one rotation of said first rotator.

6. An apparatus for detecting crank angle position in an internal combustion engine according to claim 1, wherein there are provided seven detectable parts on said second rotator, and the angle intervals between said detectable parts on said second rotator are 90 degrees, 22.5 degrees, 67.5 degrees, 45.0 degrees, 45.5 degrees, 67.5 degrees and 22.5 degrees.

7. An apparatus for detecting crank angle position in an internal combustion engine according to claim 1, wherein there are provided seven detectable parts on said second rotator, and the angle intervals between said detectable parts on said second rotator are 52.0 degrees, 39.0 degrees, 63.0 degrees, 52.0 degrees, 78.0 degrees, 50.0 degrees and 26.0 degrees.

8. An apparatus for detecting crank angle position in an internal combustion engine according to claim 1, wherein there are provided seven detectable parts on said second rotator, and the angle intervals between said detectable parts on said second rotator are 45.0 degrees, 45.0 degrees, 30.0 degrees, 60.0 degrees, 60.0 degrees, 30.0 degrees and 90.0 degrees.

9. An apparatus for detecting crank angle position in an internal combustion engine according to claim 1, wherein there are provided six detectable parts on said second rotator, and the angle intervals between said detectable parts on said second rotator are 44.0 degrees, 80.0 degrees, 60.0 degrees, 60.0 degrees, 80.0 degrees and 40.0 degrees.

10. An apparatus for detecting crank angle position in an internal combustion engine according to claim 1, wherein there are provided eight detectable parts on said second rotator, and the angle intervals between said detectable parts on said second rotator are 72.0 degrees, 18.0 degrees, 54.0 degrees, 36.0 degrees, 36.0 degrees, 54.0 degrees, 18.0 degrees and 72.0 degrees.

11. An apparatus for detecting a rotational angle position of a crankshaft of an internal combustion engine, the internal combustion engine having at least one camshaft operatively associated with the crankshaft such that the at least one camshaft rotates at a predetermined ratio relative to the crankshaft, comprising:

first rotating means provided on the crankshaft such that the first rotating means rotates with the crankshaft;

second rotating means provided on the camshaft such that the second rotating means rotates with the camshaft;

a plurality of first detectable means provided on the first rotating means at generally equal intervals;

a plurality of second detectable means provided on the second rotating means at different intervals such that two consecutive intervals measured in a rotational direction of the second rotating means are different from each other;

first detection means for detecting a first pulse generated by the plurality of first detectable means on the first rotating means;

second detection means for detecting a second pulse generated by the plurality of second detectable means on the second rotating means; and means for calculating the rotational angle position of the crankshaft based on the first and second pulses.

12. A crankshaft assembly for use in an apparatus for detecting a rotational angle position of a crankshaft of an internal combustion engine, comprising:

a camshaft;

a member attached to the camshaft such that the member rotates with the camshaft; and a plurality of detectable elements spacedly provided on the member such that consecutive angle intervals of the plurality of detectable elements, measured in a rotational direction of the camshaft, are different from each other.

13. A crankshaft assembly according to claim 12, wherein there are provided seven detectable elements on the member, and the angle intervals between the detectable elements on the member are 90 degrees, 22.5 degrees, 67.5 degrees, 45.0 degrees, 45.5 degrees, 67.5 degrees and 22.5 degrees.

14. A crankshaft assembly according to claim 12, wherein there are provided seven detectable elements on the member, and the angle intervals between the detectable elements on the member are 52.0 degrees, 39.0 degrees, 63.0 degrees, 52.0 degrees, 78.0 degrees, 50.0 degrees and 26.0 degrees.

15. A crankshaft assembly according to claim 12, wherein there are provided seven detectable elements on the member, and the angle intervals between the detectable elements on the member are 45.0 degrees, 45.0 degrees, 30.0 degrees, 60.0 degrees, 60.0 degrees, 30.0 degrees and 90.0 degrees.

16. A crankshaft assembly according to claim 12, wherein there are provided six detectable elements on the member, and the angle intervals between the detectable elements on the member are 44.0 degrees, 80.0 degrees, 60.0 degrees, 60.0 degrees, 80.0 degrees and 40.0 degrees.

17. A crankshaft assembly according to claim 12, wherein there are provided eight detectable elements on the member, and the angle intervals between the detectable elements on the member are 72.0 degrees, 18.0 degrees, 54.0 degrees, 36.0 degrees, 36.0 degrees, 54.0 degrees 18.0 degrees.

* * * * *